(12) United States Patent
Hao et al.

(10) Patent No.: US 10,674,166 B2
(45) Date of Patent: Jun. 2, 2020

(54) METHOD AND SYSTEM FOR SCALABLE VIDEO STREAMING

(71) Applicant: AT&T Intellectual Property I, L.P., Atlanta, GA (US)

(72) Inventors: Shuai Hao, Hillsborough, NJ (US); Subhabrata Sen, Westfield, NJ (US); Anis Elgabli, West Lafayette, IN (US); Feng Qian, Bloomington, IN (US); Vaneet Aggarwal, Parsippany, NJ (US)

(73) Assignees: Purdue Research Foundation, West Lafayette, IN (US); AT&T Intellectual Property I, L.P., Atlanta, GA (US); The Trustees of Indiana University, Bloomington, IN (US)

( * ) Notice: Subject to any disclaimer, the term of this patent is extended or adjusted under 35 U.S.C. 154(b) by 0 days.

(21) Appl. No.: 16/109,333

(22) Filed: Aug. 22, 2018

(65) Prior Publication Data
US 2020/0068209 A1 Feb. 27, 2020

(51) Int. Cl.
H04L 29/06 (2006.01)
G06F 15/16 (2006.01)
H04L 29/08 (2006.01)
H04N 19/30 (2014.01)

(52) U.S. Cl.
CPC .................. *H04N 19/30* (2014.11)

(58) Field of Classification Search
CPC .................................... H04N 19/30
USPC .................................. 375/240.02
See application file for complete search history.

(56) References Cited

U.S. PATENT DOCUMENTS

| 8,265,140 B2 | 9/2012 | Mehrotra |
| 8,898,228 B2 | 11/2014 | Myers et al. |
| 9,258,333 B2 | 2/2016 | Bichot et al. |
| 9,621,613 B1 | 4/2017 | Huang et al. |
| 9,661,051 B2 | 5/2017 | Panwar |
| 9,681,175 B2 | 6/2017 | Gautier et al. |
| 9,722,903 B2 | 8/2017 | Halepovic et al. |
| 9,756,112 B2 | 9/2017 | Jana et al. |
| 9,942,585 B2 | 4/2018 | Ramamurthy et al. |
| 2010/0332671 A1* | 12/2010 | Alfonso ............ H04L 12/6418 709/230 |

(Continued)

OTHER PUBLICATIONS

Elgabli, Anis, "Optimized Preference-Aware Multi-Path Video Streaming With Scalable Video Coding", Jun. 7, 2018, 16 pages.

*Primary Examiner* — Zaihan Jiang
(74) *Attorney, Agent, or Firm* — Guntin & Gust, PLC; Douglas Schnabel

(57) ABSTRACT

Aspects of the subject disclosure may include, for example, receiving a request for media content, the media content being divided into a plurality of chunks, obtaining information about the chunks and constraints, determining whether there is a remaining layer to be downloaded, in response to determining that there is a remaining layer to be downloaded, determining a list of chunks that can be downloaded at a current layer and a downloading schedule according to the list of chunks that can be downloaded at the current layer, in response to determining that there is no remaining layer to be downloaded, producing a composite schedule for downloading the media content, and downloading the media content according to the composite schedule. Other embodiments are disclosed.

17 Claims, 11 Drawing Sheets

(56) References Cited

U.S. PATENT DOCUMENTS

| | | | |
|---|---|---|---|
| 2012/0030723 A1* | 2/2012 | Baum | H04N 21/234327 725/105 |
| 2013/0013803 A1* | 1/2013 | Bichot | H04L 65/1046 709/231 |
| 2013/0287123 A1* | 10/2013 | Rusert | H04N 21/2343 375/240.26 |
| 2014/0219346 A1* | 8/2014 | Ugur | H04N 19/105 375/240.12 |
| 2014/0281000 A1* | 9/2014 | Dattagupta | H04L 47/11 709/231 |
| 2014/0341026 A1* | 11/2014 | Gahm | H04L 47/76 370/232 |
| 2014/0344875 A1* | 11/2014 | Bae | H04N 21/2381 725/109 |
| 2015/0113159 A1* | 4/2015 | Gogoi | H04N 21/234327 709/231 |
| 2015/0271231 A1 | 9/2015 | Luby et al. | |
| 2015/0341634 A1* | 11/2015 | Jiang | H04N 19/30 375/240.02 |
| 2016/0277475 A1* | 9/2016 | Lee | H04L 65/80 |
| 2018/0027039 A1 | 1/2018 | Moorthy et al. | |
| 2018/0035176 A1 | 2/2018 | Stockhammer | |
| 2018/0095665 A1* | 4/2018 | Xu | G06F 3/0604 |
| 2019/0190975 A1* | 6/2019 | Beheydt | H04L 65/607 |

\* cited by examiner

Fig. 1: AVC vs SVC Encoding

METHOD AND SYSTEM FOR SCALABLE VIDEO STREAMING

FIELD OF THE DISCLOSURE

The subject disclosure relates to scalable video streaming that can apply a video streaming algorithm, such as for use in cellular networks.

BACKGROUND

Mobile video has emerged as a dominant contributor to cellular traffic. It accounts for around 40-55 percent of all cellular traffic and is forecast to grow by around 55 percent annually through 2021. While its popularity is on the rise, delivering high quality streaming video over cellular networks remains extremely challenging. The video quality under challenging conditions such as mobility and poor wireless channel qualities is sometimes unacceptably poor.

BRIEF DESCRIPTION OF THE DRAWINGS

Reference will now be made to the accompanying drawings, which are not necessarily drawn to scale, and wherein.

DETAILED DESCRIPTION

Figure 1:
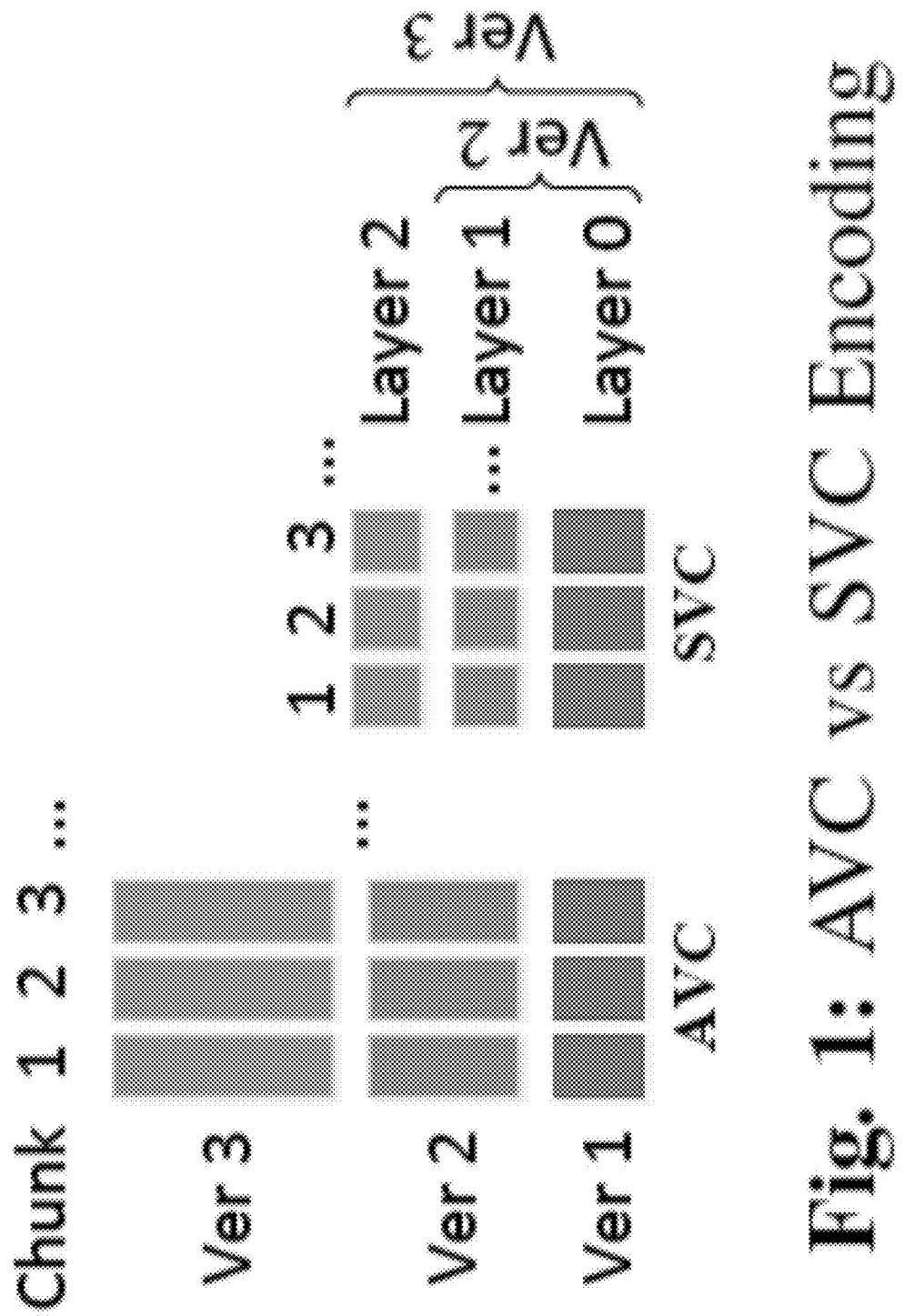
FIG. 1 is a block diagram illustrating exemplary coding schemes encoding media content, such as video, in accordance with various aspects described herein.

The subject disclosure describes, among other things, illustrative embodiments for streaming media content, such as video. Other embodiments are described in the subject disclosure.

One or more aspects of the subject disclosure include a method, device or instructions for receiving a request for media content divided into a series of chunks; obtaining information about the series of chunks, such as a number of chunks of the media content and/or a number of layers of each chunk in the series of chunks; obtaining constraints, such as a bandwidth constraint and a buffer constraint; determining whether there is a remaining layer to be downloaded; in response to determining that there is the remaining layer to be downloaded, determining a list of chunks that can be downloaded at a current layer and a downloading schedule according to the list of chunks that can be downloaded at the current layer; in response to determining that there is no remaining layer to be downloaded, producing a composite schedule for downloading the media content; and downloading the media content according to the composite schedule.

Determining the list of chunks may include determining whether there is a remaining chunk at the current layer; in response to determining that there is the remaining chunk at the current layer, determining whether the bandwidth constraint would be violated; in response to determining that the bandwidth constraint would not be violated, determining whether the buffer constraint would be violated; in response to determining that the buffer constraint would not be violated, adding the remaining chunk to the list of chunks; and in response to determining that there is no remaining chunk at the current layer, producing the list of chunks.

Determining the downloading schedule may include determining whether there is a remaining chunk at the current layer; in response to determining that there is the remaining chunk at the current layer, determining a time that the remaining chunk can be downloaded; adding the time that the remaining chunk can be downloaded to the downloading schedule; and in response to determining that there is no remaining chunk at the current layer, producing the downloading schedule.

The list of chunks that can be downloaded at a current layer may list each chunk in the series of chunks in order from a last chunk to a first chunk. The composite schedule may or may not include at least a base layer for each chunk in the series of chunks.

Determining the list of chunks that can be downloaded at the current layer may include determining a base list of chunks that can be downloaded at a base layer; determining an intermediate list of chunks that can be downloaded at an intermediate layer; and determining a top list of chunks that can be downloaded at a top layer. The base layer for each chunk may represent that chunk at a lowest resolution. The base layer combined with the intermediate layer for each chunk may represents that chunk at an intermediate resolution greater than the lowest resolution. The base layer combined with the intermediate layer and the top layer for each chunk may represent that chunk at a highest resolution, greater than the intermediate resolution. For each chunk in the series of chunks, the base layer may be downloaded before the intermediate layer and the intermediate layer may be downloaded before the top layer. In some embodiments, these layers are downloaded consecutively, for each chunk in turn. In some embodiments, each chunk at a given layer is downloaded before beginning to download subsequent layers.

One or more aspects of the subject disclosure include a method, device or instructions for receiving a request for media content divided into a plurality of chunks; obtaining information about the plurality of chunks, such as a first number indicating a quantity of chunks of the plurality of chunks and a second number indicating a quantity of layers of each chunk of the plurality of chunks; obtaining constraints, such as a bandwidth constraint and a buffer constraint; determining a minimum stall time to download a base layer of each chunk of the plurality of chunks according to the first number, the bandwidth constraint, and the buffer constraint; determining a base downloading schedule for all chunks of the plurality of chunks at the base layer; downloading all chunks of the plurality of chunks at the base layer; determining whether there is a remaining enhancement layer to be downloaded; in response to determining that there is the remaining enhancement layer to be downloaded, determining a list of chunks that can be downloaded at a current enhancement layer and an enhancement downloading schedule according to the list of chunks that can be downloaded at the current enhancement layer; in response to determining that there is no remaining enhancement layer to be downloaded, producing a composite schedule for downloading the media content; and downloading enhancement layers of the media content according to the composite schedule.

One or more aspects of the subject disclosure include a method, device or instructions for receiving a request for media content divided into a plurality of chunks; obtaining information about the plurality of chunks of the media content, such as a quantity of chunks and a quantity of layers of each chunk; obtaining a bandwidth constraint and a buffer constraint; determining whether there is a remaining layer to be downloaded; in response to determining that there is the remaining layer to be downloaded, determining a list of chunks that can be downloaded at a current layer and a downloading schedule according to the list of chunks that can be downloaded at the current layer; in response to determining that there is no remaining layer to be downloaded, producing a composite schedule for downloading the media content; and downloading the media content according to the composite schedule.

Content Encoding:

On the server side, the content can be encoded at multiple resolutions/quality levels (each with different bandwidth requirements). The resulting encoding at a given quality level is divided into multiple chunks, each containing data corresponding to some playback time (e.g., 6 seconds).

Adaptive Playback:

During playtime, an entity (often the player) dynamically switches between the different available quality levels as it requests and streams the video over the network. The adaptation can be based on many factors such as the network condition, its variability, and the client buffer occupancy etc. This results in a viewing experience where different chunks of the video might be streamed at different quality levels.

One coding technique in use today is called Adaptive Video Coding (AVC). In AVC, each video chunk is stored into L independent encoding versions. During playback when fetching a chunk, the player's adaptation mechanism needs to select one out of the L versions based on its judgement of the network condition and other factors mentioned above.

An alternative scheme is Scalable Video Coding (SVC). The basic idea of SVC is to encode a chunk into ordered layers: one base layer (Layer 0) with the lowest playable quality, and multiple enhancement layers (Layer i>0) that further improve the chunk quality based on layer i−1. When downloading a chunk, a player must download all layers from 0 to i−1 before fetching layer i. In contrast, in conventional AVC encoding, different versions (i.e., qualities) of chunks are independent, as illustrated in FIG. 1. If, in AVC, a chunk is not fully downloaded before its playback deadline, a stall will occur. This issue can be easily mitigated by SVC: if layer i+1 is not fully downloaded at the chunk playback deadline, the chunk is still playable at a lower quality of up to layer i. SVC encoding has indeed been shown to be able to cope much better with highly variable bandwidth, which is one of the key characteristics of cellular networks.

Reducing Bandwidth Wastage:

Assume a player switches to a higher bitrate during a playback. This can be triggered either manually or automatically by the rate adaptation algorithm. Then consider those chunks that are already downloaded to the player's buffer. For regular AVC, those buffered low-quality chunks are either played or discarded if the player replaces them with high-quality chunks. Thus, the actual quality switch either happens later or happens immediately with bandwidth waste incurred. This dilemma can be elegantly addressed by SVC: the player can reuse the buffered chunks by augmenting them using enhancement layers.

Improving Video Caching:

SVC can also make video caching more efficient. For a regular AVC video chunk, a caching proxy needs to cache all its versions (e.g., up to 8 versions for a YouTube video). For an SVC chunk, the proxy only needs to cache all its layers, whose total size is equivalent to that of a single AVC chunk at the highest quality.

In SVC, video contents are divided into small chunks, each encoded at ordered and interdependent layers. E.g. base layer and additional enhancement layers. During video streaming, the client must decide which layers it needs to fetch for each video chunk to maximize users' Quality of Experience (or QoE). Although there is no clear definition of how to quantify QoE, it is generally agreed that less number of stalls or quality switches and higher overall bitrates can provide a better QoE. Hence, we choose to minimize the number of stalls, maximize overall bitrate, and minimize the number of quality switches, when we want to optimize video user QoE.

Skip-Based Streaming:

The video is played with an initial start-up (i.e., buffering) delay S seconds and there is a playback deadline for each of the chunks where chunk i need to be downloaded by time deadline (i). Chunks not received by their respective deadlines are skipped. This is suitable for live streaming, for example.

No-Skip Based Streaming:

It also has start-up delay. However, if a chunk cannot be downloaded by its deadline, it will not be skipped. Instead, a stall (i.e., rebuffering) will occur i.e., the video will pause until the chunk is fully downloaded. The latter is suitable for Video on-demand (or VoD) streaming, for example.

In both scenarios, the goal of the scheduling algorithm is to determine up to which layer we need to fetch for each chunk (except for those skipped), such that the number of stalls or skipped chunks is minimized as a priority, the overall playback bitrate is maximized as another priority, the number of quality switching between neighboring chunks is minimized as another priority. In one embodiment, the number of stalls or skipped chunks is minimized as the top priority, the overall playback bitrate is maximized as the next priority, the number of quality switching between neighboring chunks is minimized as the third priority.

The QoE optimization problem is made more challenging by the following constraints: 1) dependency between different layers for a given video chunk (recall that all layers from 0 to i must be fetched to decode and play the chunk at quality layer i); 2) limited client buffer size; 3) limited and inaccurate knowledge about network bandwidth.

Skip-Based Streaming:

Let us assume a video divided into C chunks, where every chunk is of length L seconds, is encoded in Base Layer (BL) with rate $r_0$ and N enhancement layers ($E_1, \ldots, E_N$) with rates $(r_1, \ldots, r_N) \in \mathcal{R} \triangleq \{0, r_0, r_1, \ldots, r_N\}$. The size of the chunk i delivered at layer n is $Z_{n,i} \in \mathcal{Z}_n \triangleq \{0, Y_n\}$, where $Y_n = L \times r_n$. The size of a chunk delivered up to layer n is $$X_{i,n} = \sum_{m=0}^{n} Z_{m,i}.$$

Let $z_n(i,j)$ be the size of layer n of chunk i that is fetched at time slot j, x(i,j) be what is fetched of all layers of chunk i at time slot j, i.e.

$$x(i, j) = \sum_{n=0}^{N} z_n(i, j).$$

Further, let B(j) be the available bandwidth at time j.

Overall, the SVC layer scheduling problem with the knowledge of future bandwidth information can be formulated as follows, where I(•) is an indicator function which has the value 1 if inside expressions holds and zero otherwise.

$$\text{maximize} \left( \sum_{n=0}^{N} \gamma^n \sum_{i=1}^{C} \beta^i Z_{n,i} \right) \quad (1)$$

subject to $$\sum_{j=1}^{(i-1)L+s} z_0(i, j) = Z_{0,i} \; \forall \; i = 1, \ldots, C \quad (2)$$

$$\sum_{j=1}^{(i-1)L+s} z_n(i, j) = Z_{n,i}, \; \forall \; i, n \quad (3)$$

$$Z_{n,i} \leq \frac{Y_n}{Y_{n-1}} Z_{n-1,i}, \; \forall \; i, n \quad (4)$$

$$\sum_{n=0}^{N} \sum_{i=1}^{C} z_n(i, j) \leq B(j) \; \forall \; j = 1, \ldots, (C-1)L + s, \quad (5)$$

$$\sum_{i,(i-1)L+s>t} I\left( \sum_{j=1}^{t} \left( \sum_{n=0}^{N} z_n(i, j) \right) > 0 \right) L \leq B_m \; \forall \; t \quad (6)$$

$$z_n(i, j) \geq 0 \; \forall \; i = 1, \ldots, C \quad (7)$$

$$z_n(i, j) = 0 \; \forall \; i, (i-1)L + s > j \quad (8)$$

$$Z_{n,i} \in \mathcal{Z}_n \; \forall \; i = 1, \ldots, C, \text{ and } \forall \; n = 1, \ldots, N \quad (9)$$

Variables: $z_n(i, j), Z_{n,i} \; \forall \; i = 1, \ldots, C$, $j = 1, \ldots, (C-1)L + s, n = 0, \ldots, N$ In the above formulation, we have $0 < \gamma \ll 1$, so we prioritize base layers to minimize stall, and $\beta = 1 + \varepsilon$ where $\varepsilon$ is a very small number (say 0.001), so we minimize the number of single layer switches for any quality decisions that minimizes the number of skips and maximizes average quality. Constraints (2) and (9) ensure that what is fetched for layer 0 (the base layer) of chunk i over all times to be either zero or the base layer quality. Constraints (3) and (9) ensure the same for the enhancement layers. Constraint (4) ensures that a nth layer cannot be fetched if the lower layer has not been fetched. Constraint (5) imposes the available bandwidth constraint at each time slot j and (6) imposes the playback buffer constraint so that the content in the buffer at any time does not exceed the buffer capacity Bm. Constraint (7) imposes the non-negativity of chunk download, and (8) imposes the deadline constraint where the deadline of chunk i is (i−1)*L+s.

No-Skip Based Streaming:

In no-skip streaming (e.g. watching a VoD video), when the deadline of a chunk cannot be met, rather than skipping it, the player will stall the video and continue downloading the chunk. The objective here is to maximize the average quality while minimizing the stall duration (the rebuffing time). The objective function is slightly different from equation (1) since we do not allow to skip the base layer. However, we skip higher layers. For the constraints, all constraints are the same as skip based optimization problem except that we modify constraint (2) to enforce the $Z_0(i)$ for every chunk i to be equal to the BL size ($Y_0$). We define the total stall (re-buffering) duration from the start till the play-time of chunk i as d(i). Therefore, the deadline of any chunk i is (i−1)*L+s+d(i). The no-skip formulation can thus be written as follows:

$$\text{maximize} \sum_{n=1}^{N} \gamma^n \sum_{i=1}^{C} \beta^i Z_{n,i} - \lambda d(C) \quad (12)$$

subject to, $$\sum_{j=1}^{(i-1)L+s+d(i)} z_0(i, j) = Y_0 \; \forall \; i = 1, \ldots, C \quad (13)$$

$$\sum_{j=1}^{(i-1)L+s+d(i)} z_n(i, j) = Z_{n,i}, \; \forall \; i, n \quad (14)$$

$$Z_{n,i} \leq \frac{Y_n}{Y_{n-1}} Z_{n-1,i}, \; \forall \; i, n \quad (15)$$

$$\sum_{n=0}^{N} \sum_{i=1}^{C} z_n(i, j) \leq B(j) \; \forall \; 1 \leq j \leq (C-1)L + s + d(C), \quad (16)$$

$$\sum_{n=0}^{N} \sum_{i,(i-1)L+s+d(i)>t} I\left( \sum_{j=1}^{t} (z_n(i, j)) > 0 \right) L \leq B_m \; \forall \; t \quad (17)$$

$$z_n(i, j) \geq 0 \; \forall \; i = 1, \ldots, C \quad (18)$$

$$z_n(i, j) = 0 \; \forall \; i, (i-1)L + s + d(i) > j \quad (19)$$

$$d(i+1) \geq d(i) \geq 0 \; \forall \; i = 1, \ldots, C-1 \quad (20)$$

$$Z_{n,i} \in \mathcal{Z}_n \; \forall \; i = 1, \ldots, C, \text{ and } \forall \; n = 1, \ldots, N \quad (21)$$

Variables: $z_n(i, j), Z_{n,i}, d(i) \forall \; i = 1, \ldots, C$, $1 \leq j \leq (C-1)L + s + d(C), n = 0, \ldots, N$ This is a multi-objective optimization problem with the stall duration and weighted quality as the two parameters. The weight to the stall is chosen such that $\lambda \gg 1$, since users tend to care more about not running into rebuffering over better quality. With this assumption, we can solve the optimization problem optimally with a slightly modification of the algorithm proposed for the skip version.

Skip-Based Streaming:

The problem defined in equation (1) to (9) has integer constraints and indicator functions and is in the class of combinatorial optimization. In general, our problem can be proven as NP hard. But we will show that this combinatorial optimization problem can be solved optimally in polynomial time, since we assume that $\beta>1$ and $0<\gamma\ll1$.

The proposed system and/or algorithm may utilize the properties of the problem structure: the lower layers have more priority over the higher layers thus allowing us to make the decision layer-by-layer. For each layer, given the decisions at the previous layer, the problem can be solved using a bin-packing based algorithm. However, the deadline and the buffer constraints make the algorithm and proving optimality challenging. Indeed, the polynomial time algorithm proposed is linear in the number of chunks as described below.

Figure 2:
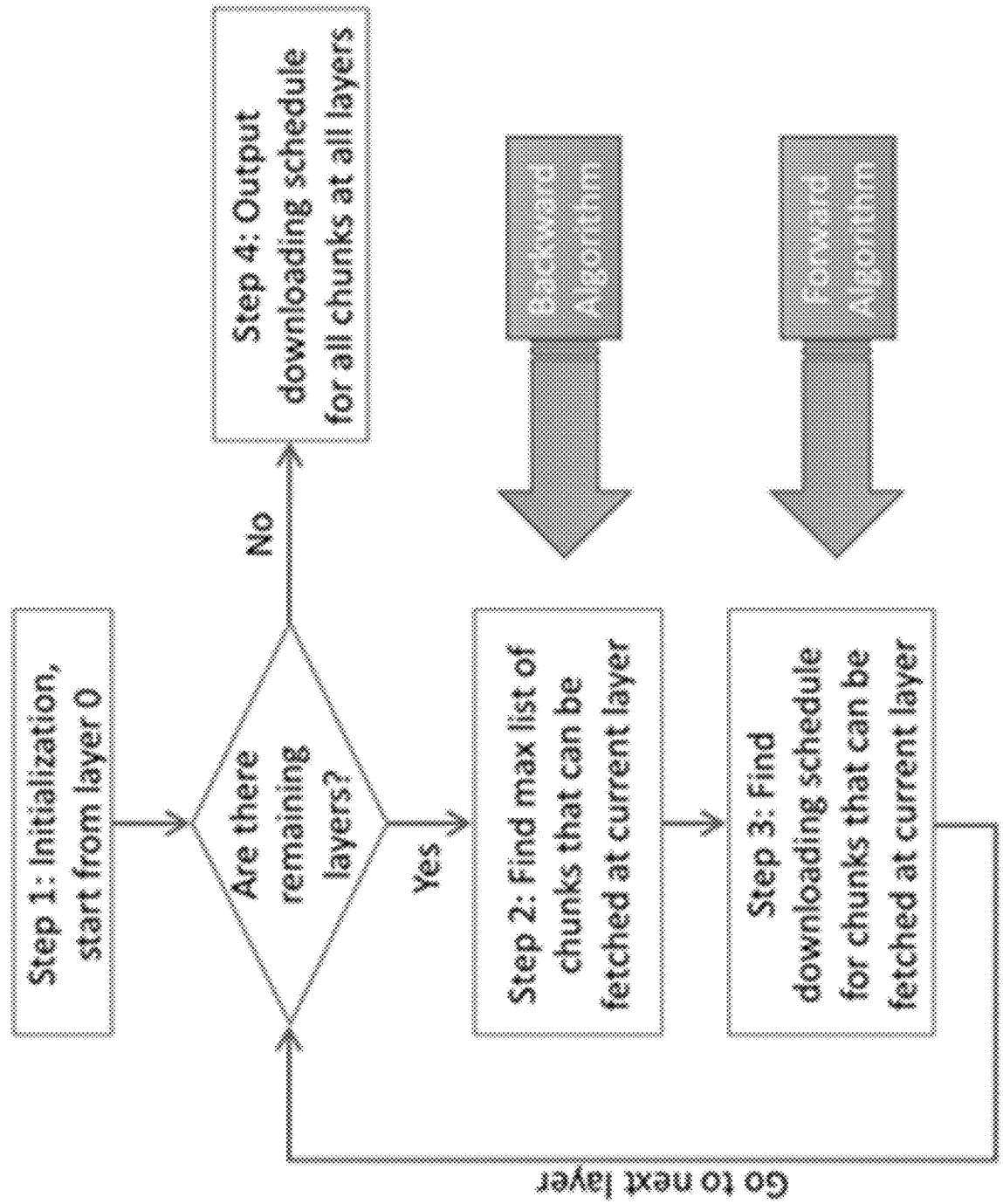
FIG. 2 depicts an illustrative embodiment of a method in accordance with various aspects described herein.

FIG. 2 shows an exemplary deadline and buffer aware bin packing algorithm for skip based streaming. The input to this algorithm are available bandwidth information in time series, buffer constraint, and deadline for each chunk. The output is downloading schedule for all chunks at all layers. From high level, the bin packing algorithm goes through all layers, starting from basic layer to the highest enhancement layer, and find the downloading schedule for each layer. To do that, it uses two algorithms: backward algorithm (FIG. 3) and forward algorithm (FIG. 4).

Figure 3:
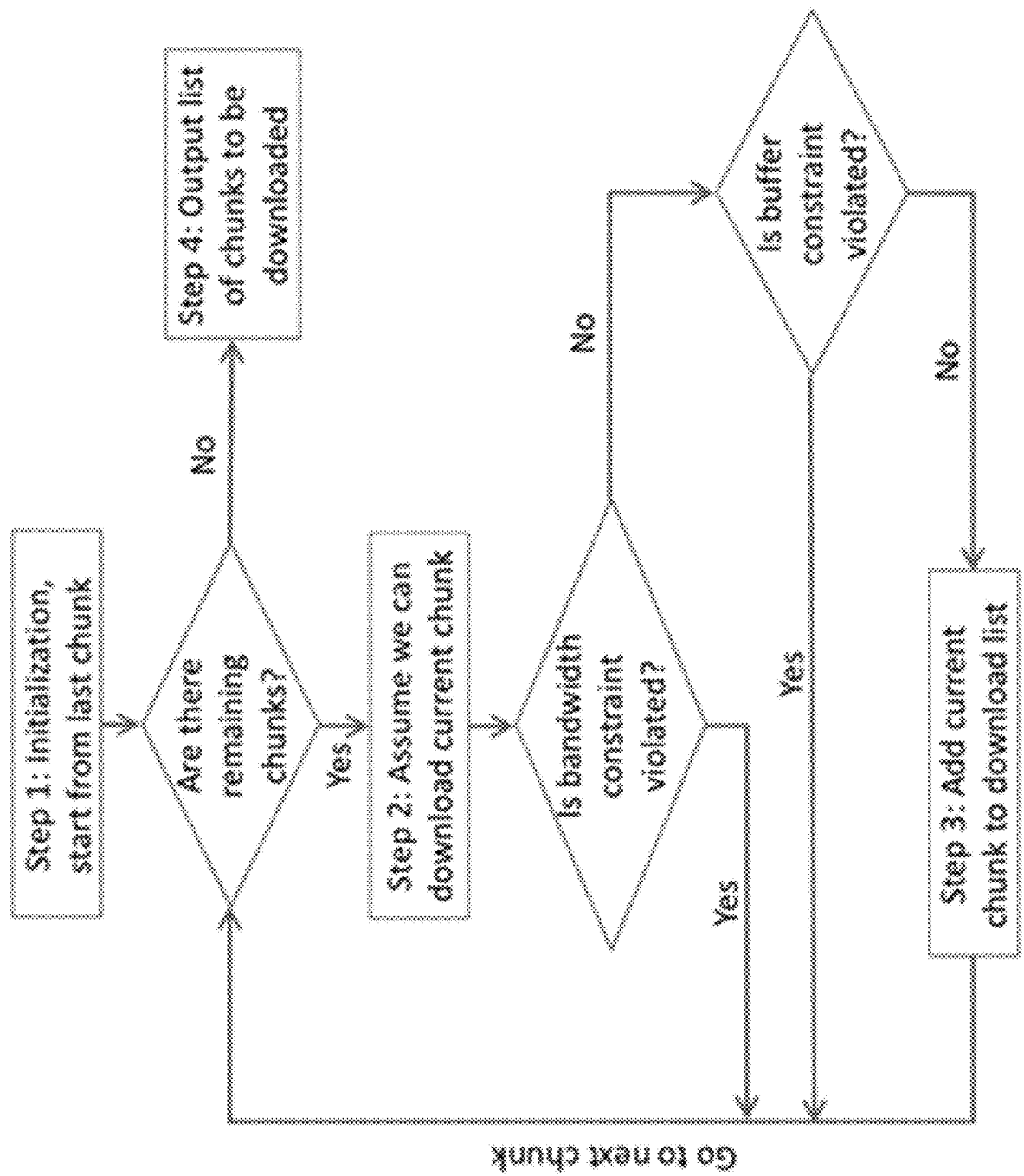
FIG. 3 depicts an illustrative embodiment of a method in accordance with various aspects described herein.

FIG. 3 shows an exemplary backward algorithm. The input to this algorithm are the same as the bin packing algorithm, except the given layer information. The output is the list of chunks that can be downloaded at given layer. It goes through each chunk in a backward fashion, from the last chunk to the first. For each chunk, it checks two constraints: bandwidth and buffer. If the available bandwidth is sufficient to download current chunk at given layer and the buffer is also sufficient to store the downloaded chunk. It will go ahead and add this chunk to the list. Otherwise, it moves to the next chunk.

Figure 4:
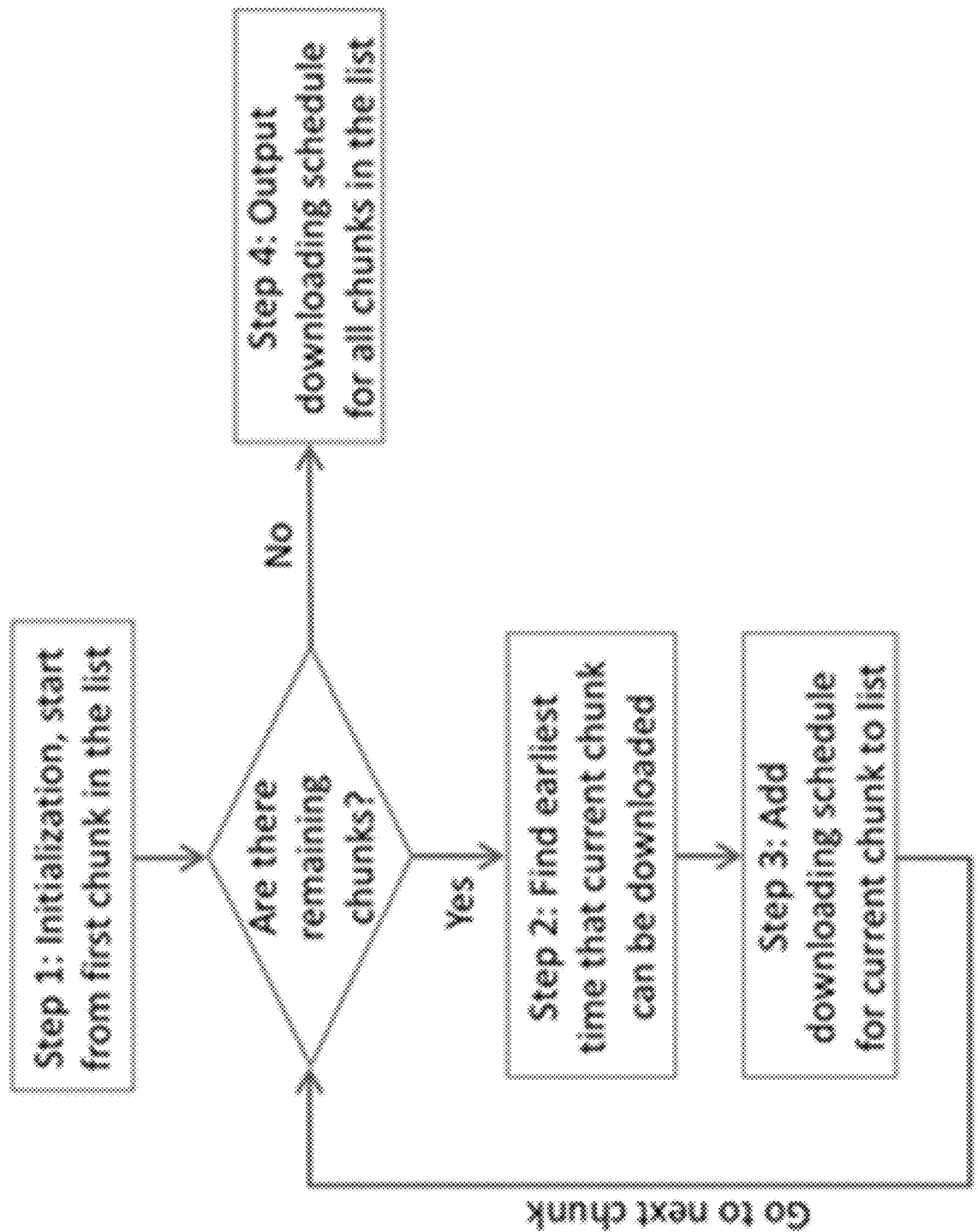
FIG. 4 depicts an illustrative embodiment of a method in accordance with various aspects described herein.

FIG. 4 shows an exemplary forward algorithm. The input to this algorithm are the same as the bin packing algorithm, except the list of chunks that can be downloaded at given layer (i.e. the output of backward algorithm). The output is the downloading schedule for all chunks in the list. It basically goes through all previously selected chunks, finds the earliest time that current chunk can be downloaded, and adds that to the downloading schedule.

No-Skip Based Streaming:

An exemplary no-skip based video streaming problem is defined in equations (12) to (21). In the optimization problem's objective function, it has the stall duration and weighted quality as the two parameters. The weight to the stall is chosen such that $\lambda\gg1$, since users tend to care more about not running into rebuffering over better quality. With this assumption, we can solve the optimization problem optimally with a slight modification of the algorithm proposed for the skip version.

Figure 5:
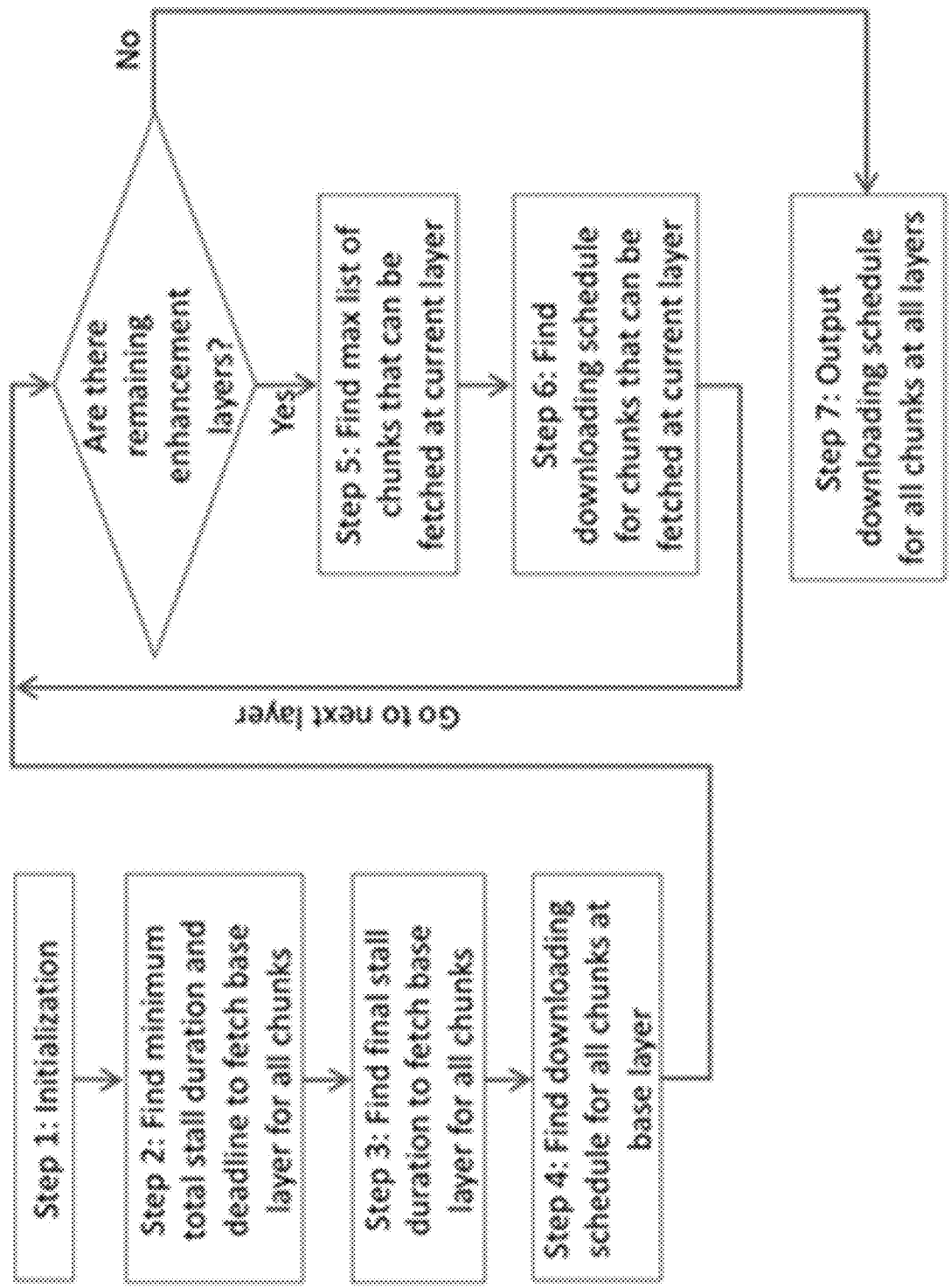
FIG. 5 depicts an illustrative embodiment of a method in accordance with various aspects described herein.

FIG. 5 shows an exemplary no-skip deadline and buffer aware bin packing algorithm. It shares similarity with FIG. 2, except the handling of base layer (step 2, 3). Step 4 and 6 essentially use the previous forward algorithm (as shown in FIG. 4) and step 5 uses the previous backward algorithm (as shown in FIG. 3).

The reason for handling base layer differently here is because we are not allowed to skip base layer for any chunk in the no-skip based video streaming. The idea is to determine the minimum stall time (step 2) since that is the top priority. To do this, we simulate fetching chunks in order at base layer quality. We start to fetch chunks in order. If chunk i can be fetched within its deadline, we move to the next chunk. If chunk i cannot be fetched by its deadline, we continue fetching it till it is completely fetched, and the additional time spent in fetching this chunk is added to deadline of chunk k for every $k\geq i$, since there has to be an additional stall in order to fetch these chunks. Using this, we obtain the total stall and the deadline of the last chunk, which gives the total stall duration for the algorithm and the last time slot in which there is guarantee that all chunks can be fetched when we reach it.

While step 2 determines the minimum total stall to download all chunks in base layer, we still need check the buffer constraint violation and find the downloading schedule for base layer. We use the modified backward algorithm to achieve this (step 3). If there is a buffer constraint violation, we decrement its deadline by 1 and check if the violations can be removed. This decrement can be continued till the violations are avoided. This provides the deadlines of the different chunks such that stall duration is at its minimum and stalls are brought to the earliest possible time, so we get minimum number of stalls and optimal stall pattern. When stalls are brought to their earliest possible, all chunks can have more time to get their higher layers without violating deadline. Therefore, we have higher chance of getting higher layers of later chunks. Forward algorithm (step 4) is run after that to simulate fetching chunks in order and provide lower deadlines of chunks for the enhancement layers. For enhancement layer decisions, the backward-forward scan is run as in the skip version case since skips are allowed for enhancement layers.

Figure 6:
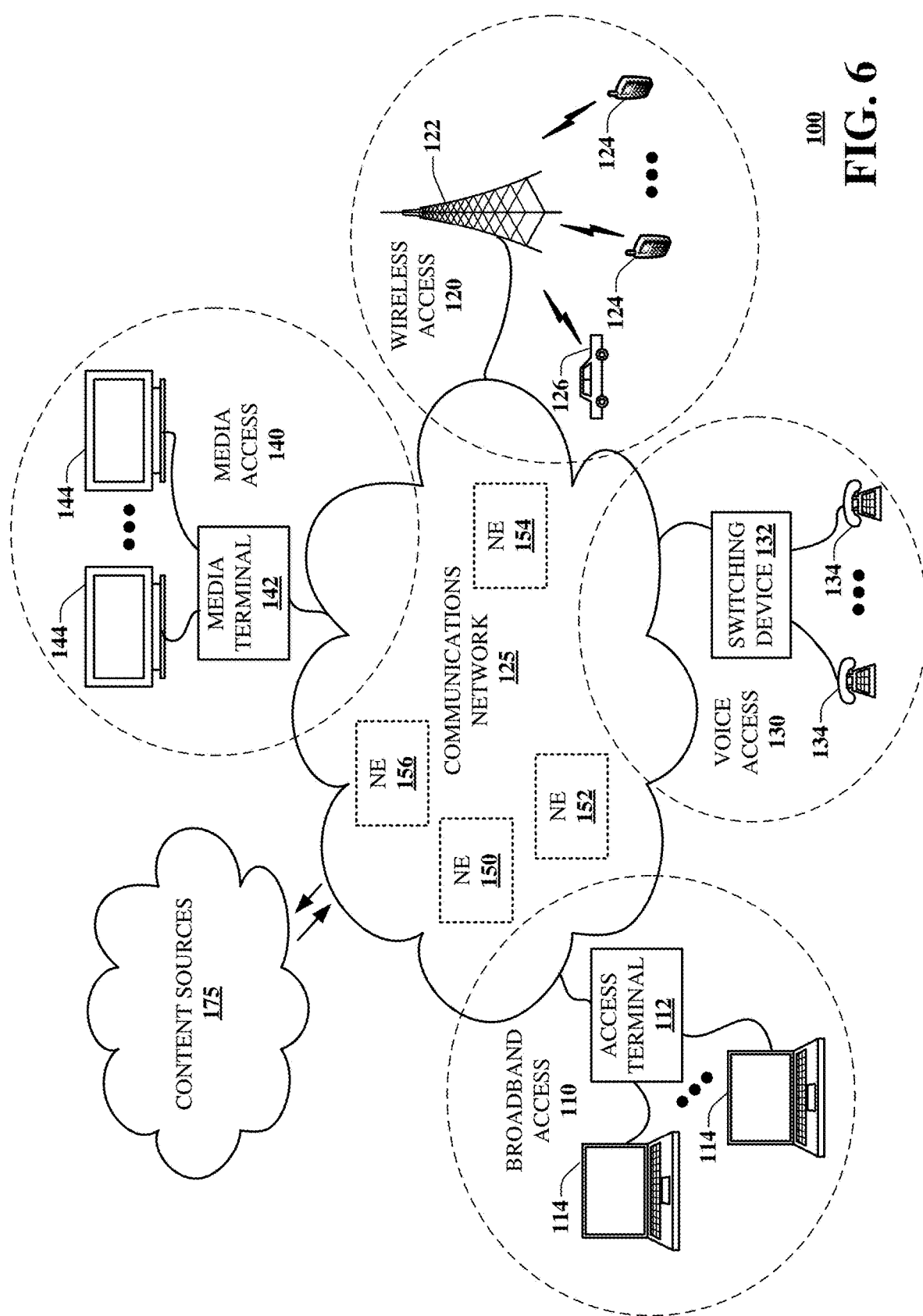
FIG. 6 is a block diagram illustrating an example, non-limiting embodiment of a communications network in accordance with various aspects described herein.

Referring now to FIG. 6, a block diagram is shown illustrating an example, non-limiting embodiment of a communications network 100 in accordance with various aspects described herein. For example, communications network 100 can facilitate in whole or in part the video streaming and/or scalable video coding scheme described herein. In particular, a communications network 125 is presented for providing broadband access 110 to a plurality of data terminals 114 via access terminal 112, wireless access 120 to a plurality of mobile devices 124 and vehicle 126 via base station or access point 122, voice access 130 to a plurality of telephony devices 134, via switching device 132 and/or media access 140 to a plurality of audio/video display devices 144 via media terminal 142. In addition, communication network 125 is coupled to one or more content sources 175 of audio, video, graphics, text and/or other media. While broadband access 110, wireless access 120, voice access 130 and media access 140 are shown separately, one or more of these forms of access can be combined to provide multiple access services to a single client device (e.g., mobile devices 124 can receive media content via media terminal 142, data terminal 114 can be provided voice access via switching device 132, and so on).

The communications network 125 includes a plurality of network elements (NE) 150, 152, 154, 156, etc. for facilitating the broadband access 110, wireless access 120, voice access 130, media access 140 and/or the distribution of content from content sources 175. The communications network 125 can include a circuit switched or packet switched network, a voice over Internet protocol (VoIP) network, Internet protocol (IP) network, a cable network, a passive or active optical network, a 4G, 5G, or higher generation wireless access network, WIMAX network, UltraWideband network, personal area network or other wireless access network, a broadcast satellite network and/or other communications network.

In various embodiments, the access terminal 112 can include a digital subscriber line access multiplexer (DSLAM), cable modem termination system (CMTS), optical line terminal (OLT) and/or other access terminal. The data terminals 114 can include personal computers, laptop computers, netbook computers, tablets or other computing devices along with digital subscriber line (DSL) modems, data over coax service interface specification (DOCSIS) modems or other cable modems, a wireless modem such as a 4G, 5G, or higher generation modem, an optical modem and/or other access devices.

In various embodiments, the base station or access point 122 can include a 4G, 5G, or higher generation base station, an access point that operates via an 802.11 standard such as 802.11n, 802.11ac or other wireless access terminal. The mobile devices 124 can include mobile phones, e-readers, tablets, phablets, wireless modems, and/or other mobile computing devices.

In various embodiments, the switching device 132 can include a private branch exchange or central office switch, a media services gateway, VoIP gateway or other gateway device and/or other switching device. The telephony devices 134 can include traditional telephones (with or without a terminal adapter), VoIP telephones and/or other telephony devices.

In various embodiments, the media terminal 142 can include a cable head-end or other TV head-end, a satellite receiver, gateway or other media terminal 142. The display devices 144 can include televisions with or without a set top box, personal computers and/or other display devices.

In various embodiments, the content sources 175 include broadcast television and radio sources, video on demand platforms and streaming video and audio services platforms, one or more content data networks, data servers, web servers and other content servers, and/or other sources of media.

In various embodiments, the communications network 125 can include wired, optical and/or wireless links and the network elements 150, 152, 154, 156, etc. can include service switching points, signal transfer points, service control points, network gateways, media distribution hubs, servers, firewalls, routers, edge devices, switches and other network nodes for routing and controlling communications traffic over wired, optical and wireless links as part of the Internet and other public networks as well as one or more private networks, for managing subscriber access, for billing and network management and for supporting other network functions.

Figure 7:
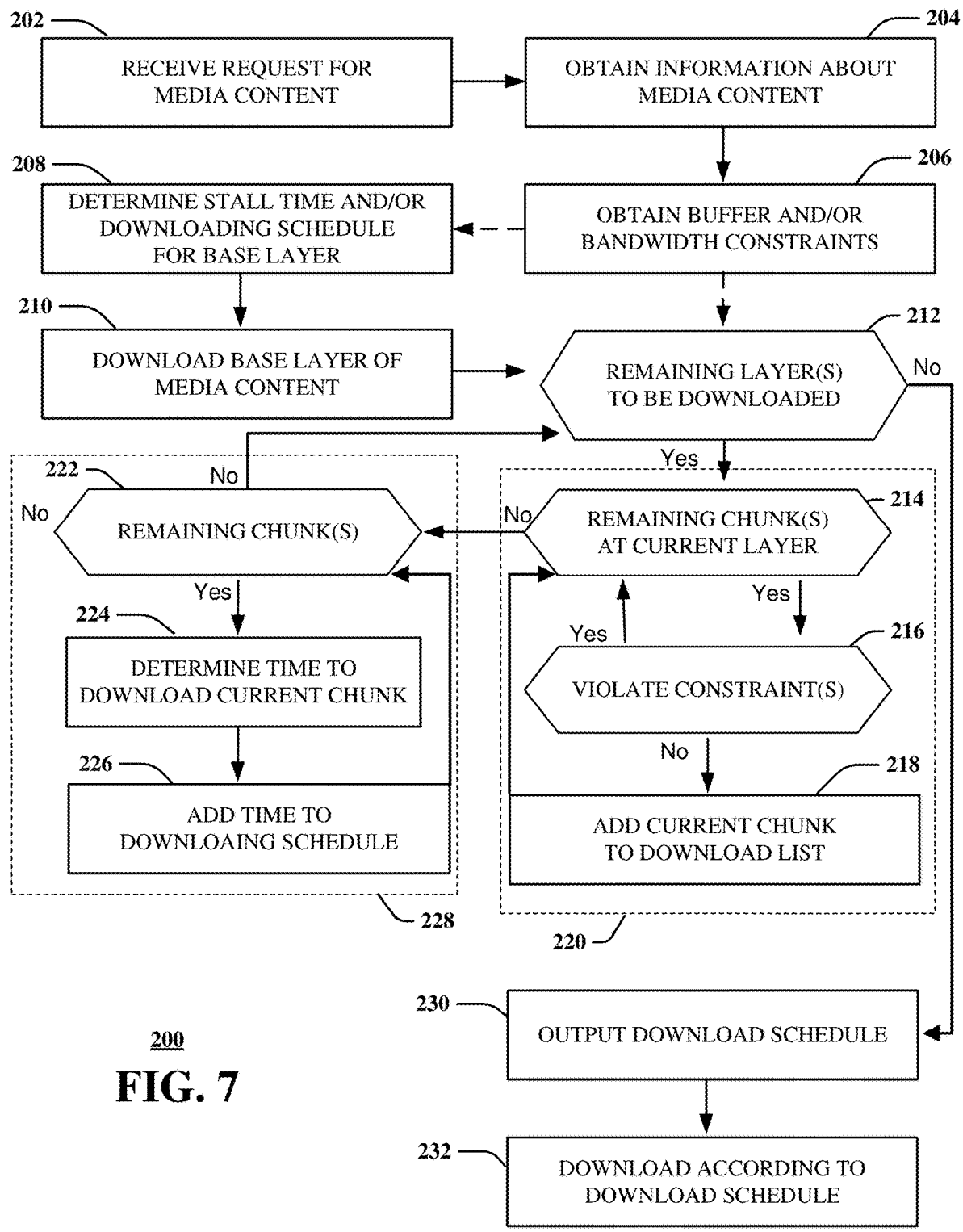
FIG. 7 depicts an illustrative embodiment of a method in accordance with various aspects described herein.

FIG. 7 depicts an illustrative embodiment of a method 200 in accordance with various aspects described herein. As shown in 202, the method 200 may being upon a user requesting media content, such as a video. The user may request the media content on or using user equipment (UE), such as any of the data terminals 114, mobile devices 124, vehicle 126, and/or display devices 144. For example, while the mobile devices 124 and vehicle 126 are clearly mobile, any of the data terminals 114 and/or display devices 144 may be mobile with current technology.

The method 200 may be performed on and/or by any of the above mentioned devices. In this case, the device may receive a request for the media content from the user, through a user interface. In some embodiments, the method 200 may be performed on and/or by the content courses 175 and/or network elements 150, 152, 154, 156 of the communications network 125.

As shown in 204, information about the requested media content is obtained and/or reviewed. The media content may be divided into chunks, such as six second segments, to facilitate transmission to the UE. As described above, using AVC, each chunk is stored in multiple versions, with each version being at a different resolution. As described above, using AVC, each chunk is stored in multiple layers, starting with a base layer and one or more enhancement layers. Adding a first enhancement layer to the base layer presents a higher resolution segment than the base layer alone. Similarly, adding first and second enhancement layers to the base layer presents a still higher resolution and so on. In any case, the information about the requested media content may include a number of chunks of the media content, a number of layers of each chunk, and/or a number of versions of each chunk. The information about the requested media content may include other information about the media content, depending on specific details of any given embodiment.

As shown in 206, information about the UE and/or the UE's network connection may be obtained. For example, information about the UE's buffer may be obtained, such as its capacity, available capacity, and/or other capabilities of the UE's buffer and/or UE itself. Information about UE's network connection may include current network conditions, the UE's connection to the network, and/or the UE's data plan. In one embodiment, this information includes a buffer constraint and a bandwidth constraint.

In one embodiment, as shown in 208, a stall time, or minimum stall time, is determined to download all chunks in the base layer. This may be done by simulating, or actually, fetching chunks in order at base layer quality. For example, the method 200 may involve immediately beginning to fetch chunks in order at base layer quality. The stall time to download all chunks in the base layer may be determined while fetching chunks, based on actual network performance during the fetching of a first portion of the chunks in the base layer. In any case, as shown in 210, all chunks in the base layer may be downloaded. Doing so, gives real world information as the network conditions and/or performance. Doing so also ensures that no chunks of the media content are skipped. However, as described above, some embodiments allow one or more chunks of the media content to be skipped. As such, steps 208 and/or 210 may not be performed by all embodiments.

Next, the method 200 goes through all layers, starting from basic layer to the highest enhancement layer, to find the downloading schedule for each layer. For example, as shown in 212, a determination is made as to whether there are remaining layers to be analyzed. If not, such as where all available layers have been analyzed and/or one of the constraints have been hit, the method 200 skips down to 230, where the downloading schedule is produced or otherwise output. Then, as shown in 232, the layers or the chunks are downloaded and/or presented to or on the UE.

As shown in 214, a determination is made as to whether there are remaining chunks to be analyzed at the current layer. As shown in 216, this analysis includes determining whether the buffer constraint and/or the bandwidth constraint are or would be violated by fetching the current layer of the current chunk. If the buffer constraint and/or the bandwidth constraint are or would be violated, then the current layer of the current chunk may be skipped, and analysis is performed for the next chuck at the current layer. If the buffer constraint and/or the bandwidth constraint would not be violated, as shown in 218, then the current layer of the current chunk may be added to the list to be downloaded, or the download list. These determinations may be made for each chunk, in order, at each layer. In some embodiments, these determinations are made in order from a last chunk to a first chunk, at each layer. As such, these processes may be referred to as a backward algorithm 220, as described above.

Next, the method 200 analyses the list of chunks to be, or that can be, downloaded at given layer to determine a downloading schedule. For example, as shown in 222, each layer of each chunk in the download list is analyzed in turn. As shown in 224, a time, or order, for downloading each layer of each chunk is determined. As shown in 226, that time is arranged into a downloading schedule, which may be a composite schedule covering each layer of each chuck that may be downloaded without violating any constraints. In some embodiments, these determinations are made in order from the first chunk to the last chunk, at each layer. In some embodiments, these determinations are made in order from the first chunk to the last chunk, with each layer of each chunk being scheduled consecutively. In some embodiments, these determinations are made in order from the first chunk to the last chunk, with each layer being scheduled consecutively such that the base layer of chunks are scheduled to be downloaded before the next layer, etc. These processes may be referred to as a forward algorithm 228, as described above.

In a "no-skip" embodiment, the composite schedule includes at least a base layer for each chunk. In an embodiment where skipping a portion of the media content is permissible, the composite schedule may not include any layers for one or more chunks. As described above, that base layer of each chunk represents that chunk at a low, or lowest acceptable, resolution. The base layer combined with a first intermediate layer for each chunk represents that chunk at a first intermediate resolution, the intermediate resolution being greater than the low resolution. The base layer combined with first intermediate layer and a second intermediate layer for each chunk represents that chunk at a second intermediate resolution, the second intermediate resolution being greater than the first intermediate resolution. The base layer combined with the intermediate layer (s) and a top layer for each chunk represents that chunk at a high, or highest, resolution, the high resolution being greater than the intermediate resolution(s).

It should be appreciated that in some embodiments, given the immediately preceding example, the first intermediate layer is not downloaded without the base layer, for that chunk. Likewise, in some embodiments, the second intermediate layer is not downloaded without the first intermediate layer, for that chunk. Likewise, in some embodiments, the top layer is not downloaded without the second intermediate layer, for that chunk.

As described above, the method 200 may be performed by one or more devices, such as the UE or and/or by the content courses 175 and/or network elements 150, 152, 154, 156 of the communications network 125. As such, some embodiments constitute such devices. Some embodiments constitute instructions for one or more devices to perform select portions of the method described above.

While for purposes of simplicity of explanation, the respective processes are shown and described as a series of blocks in FIG. 7, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methods described herein.

Figure 8:
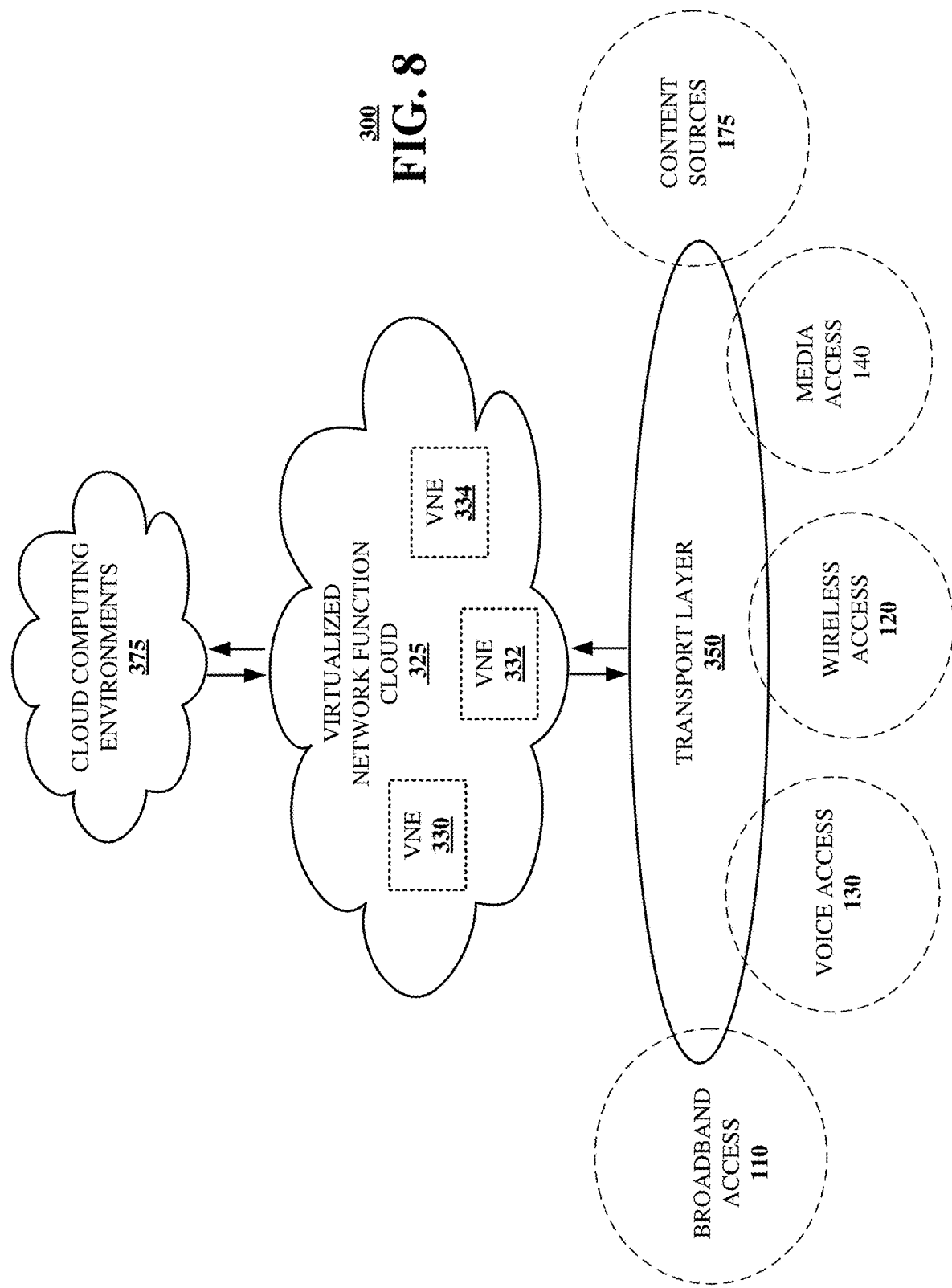
FIG. 8 is a block diagram illustrating an example, non-limiting embodiment of a virtualized communication network in accordance with various aspects described herein.

Referring now to FIG. 8, a block diagram 300 is shown illustrating an example, non-limiting embodiment of a virtualized communication network in accordance with various aspects described herein. In particular a virtualized communication network is presented that can be used to implement some or all of the subsystems and functions of communication network 100, the subsystems and functions of system 200, and method 230 presented in FIGS. 1, 2A, 2B, 2C, and 3. For example, virtualized communication network 300 can facilitate in whole or in part the video streaming and/or scalable video coding scheme described herein.

In particular, a cloud networking architecture is shown that leverages cloud technologies and supports rapid innovation and scalability via a transport layer 350, a virtualized network function cloud 325 and/or one or more cloud computing environments 375. In various embodiments, this cloud networking architecture is an open architecture that leverages application programming interfaces (APIs); reduces complexity from services and operations; supports more nimble business models; and rapidly and seamlessly scales to meet evolving customer requirements including traffic growth, diversity of traffic types, and diversity of performance and reliability expectations.

In contrast to traditional network elements—which are typically integrated to perform a single function, the virtualized communication network employs virtual network elements (VNEs) 330, 332, 334, etc. that perform some or all of the functions of network elements 150, 152, 154, 156, etc. For example, the network architecture can provide a substrate of networking capability, often called Network Function Virtualization Infrastructure (NFVI) or simply infrastructure that is capable of being directed with software and Software Defined Networking (SDN) protocols to perform a broad variety of network functions and services. This infrastructure can include several types of substrates. The most typical type of substrate being servers that support Network Function Virtualization (NFV), followed by packet forwarding capabilities based on generic computing resources, with specialized network technologies brought to bear when general purpose processors or general purpose integrated circuit devices offered by merchants (referred to herein as merchant silicon) are not appropriate. In this case, communication services can be implemented as cloud-centric workloads.

As an example, a traditional network element 150 (shown in FIG. 1), such as an edge router can be implemented via a VNE 330 composed of NFV software modules, merchant silicon, and associated controllers. The software can be written so that increasing workload consumes incremental resources from a common resource pool, and moreover so that it's elastic: so the resources are only consumed when needed. In a similar fashion, other network elements such as other routers, switches, edge caches, and middle-boxes are instantiated from the common resource pool. Such sharing of infrastructure across a broad set of uses makes planning and growing infrastructure easier to manage.

In an embodiment, the transport layer 350 includes fiber, cable, wired and/or wireless transport elements, network elements and interfaces to provide broadband access 110, wireless access 120, voice access 130, media access 140 and/or access to content sources 175 for distribution of content to any or all of the access technologies. In particular, in some cases a network element needs to be positioned at a specific place, and this allows for less sharing of common infrastructure. Other times, the network elements have specific physical layer adapters that cannot be abstracted or virtualized, and might require special DSP code and analog front-ends (AFEs) that do not lend themselves to implementation as VNEs 330, 332 or 334. These network elements can be included in transport layer 350.

The virtualized network function cloud 325 interfaces with the transport layer 350 to provide the VNEs 330, 332, 334, etc. to provide specific NFVs. In particular, the virtualized network function cloud 325 leverages cloud operations, applications, and architectures to support networking workloads. The virtualized network elements 330, 332 and 334 can employ network function software that provides either a one-for-one mapping of traditional network element function or alternately some combination of network functions designed for cloud computing. For example, VNEs 330, 332 and 334 can include route reflectors, domain name system (DNS) servers, and dynamic host configuration protocol (DHCP) servers, system architecture evolution (SAE) and/or mobility management entity (MME) gateways, broadband network gateways, IP edge routers for IP-VPN, Ethernet and other services, load balancers, distributers and other network elements. Because these elements don't typically need to forward large amounts of traffic, their workload can be distributed across a number of servers—each of which adds a portion of the capability, and overall which creates an elastic function with higher availability than its former monolithic version. These virtual network elements 330, 332, 334, etc. can be instantiated and managed using an orchestration approach similar to those used in cloud compute services.

The cloud computing environments 375 can interface with the virtualized network function cloud 325 via APIs that expose functional capabilities of the VNEs 330, 332, 334, etc. to provide the flexible and expanded capabilities to the virtualized network function cloud 325. In particular, network workloads may have applications distributed across the virtualized network function cloud 325 and cloud computing environment 375 and in the commercial cloud, or might simply orchestrate workloads supported entirely in NFV infrastructure from these third party locations.

Figure 9:
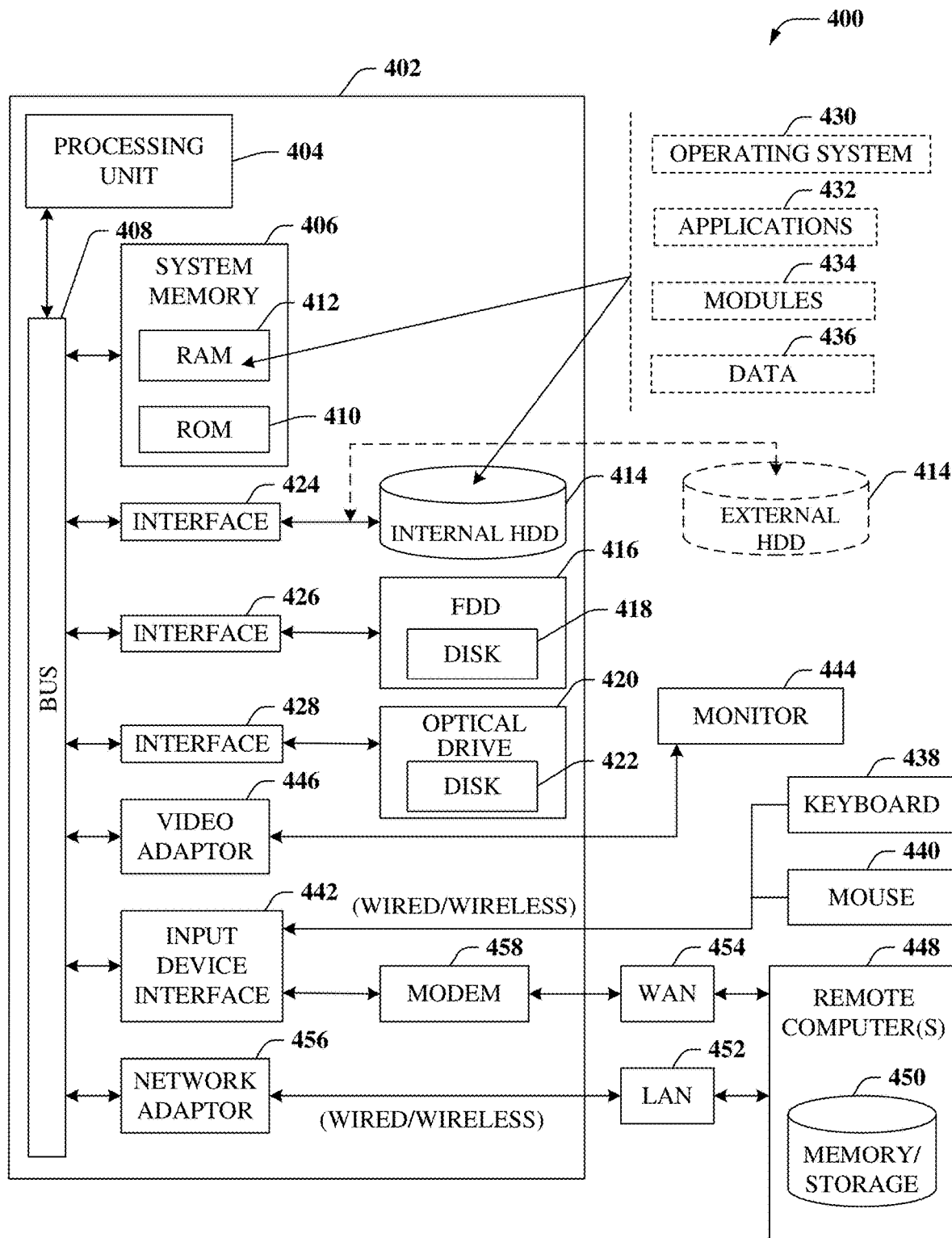
FIG. 9 is a block diagram of an example, non-limiting embodiment of a computing environment in accordance with various aspects described herein.

Turning now to FIG. 9, there is illustrated a block diagram of a computing environment in accordance with various aspects described herein. In order to provide additional context for various embodiments of the embodiments described herein, FIG. 9 and the following discussion are intended to provide a brief, general description of a suitable computing environment 400 in which the various embodiments of the subject disclosure can be implemented. In particular, computing environment 400 can be used in the implementation of network elements 150, 152, 154, 156, access terminal 112, base station or access point 122, switching device 132, media terminal 142, and/or VNEs 330, 332, 334, etc. Each of these devices can be implemented via computer-executable instructions that can run on one or more computers, and/or in combination with other program modules and/or as a combination of hardware and software. For example, computing environment 400 can facilitate in whole or in part the video streaming and/or scalable video coding scheme described herein.

Generally, program modules comprise routines, programs, components, data structures, etc., that perform particular tasks or implement particular abstract data types. Moreover, those skilled in the art will appreciate that the inventive methods can be practiced with other computer system configurations, comprising single-processor or multiprocessor computer systems, minicomputers, mainframe computers, as well as personal computers, hand-held computing devices, microprocessor-based or programmable consumer electronics, and the like, each of which can be operatively coupled to one or more associated devices.

As used herein, a processing circuit includes one or more processors as well as other application specific circuits such as an application specific integrated circuit, digital logic circuit, state machine, programmable gate array or other circuit that processes input signals or data and that produces output signals or data in response thereto. It should be noted that while any functions and features described herein in association with the operation of a processor could likewise be performed by a processing circuit.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically comprise a variety of media, which can comprise computer-readable storage media and/or communications media, which two terms are used herein differently from one another as follows. Computer-readable storage media can be any available storage media that can be accessed by the computer and comprises both volatile and nonvolatile media, removable and non-removable media. By way of example, and not limitation, computer-readable storage media can be implemented in connection with any method or technology for storage of information such as computer-readable instructions, program modules, structured data or unstructured data.

Computer-readable storage media can comprise, but are not limited to, random access memory (RAM), read only memory (ROM), electrically erasable programmable read only memory (EEPROM), flash memory or other memory technology, compact disk read only memory (CD-ROM), digital versatile disk (DVD) or other optical disk storage, magnetic cassettes, magnetic tape, magnetic disk storage or other magnetic storage devices or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and comprises any information delivery or transport media. The term "modulated data signal" or signals refers to a signal that has one or more of its characteristics set or changed in such a manner as to encode information in one or more signals. By way of example, and not limitation, communication media comprise wired media, such as a wired network or direct-wired connection, and wireless media such as acoustic, RF, infrared and other wireless media.

With reference again to FIG. 9, the example environment can comprise a computer 402, the computer 402 comprising a processing unit 404, a system memory 406 and a system bus 408. The system bus 408 couples system components including, but not limited to, the system memory 406 to the processing unit 404. The processing unit 404 can be any of various commercially available processors. Dual microprocessors and other multiprocessor architectures can also be employed as the processing unit 404.

The system bus 408 can be any of several types of bus structure that can further interconnect to a memory bus (with or without a memory controller), a peripheral bus, and a local bus using any of a variety of commercially available bus architectures. The system memory 406 comprises ROM 410 and RAM 412. A basic input/output system (BIOS) can be stored in a non-volatile memory such as ROM, erasable programmable read only memory (EPROM), EEPROM, which BIOS contains the basic routines that help to transfer information between elements within the computer 402, such as during startup. The RAM 412 can also comprise a high-speed RAM such as static RAM for caching data.

The computer 402 further comprises an internal hard disk drive (HDD) 414 (e.g., EIDE, SATA), which internal HDD 414 can also be configured for external use in a suitable chassis (not shown), a magnetic floppy disk drive (FDD) 416, (e.g., to read from or write to a removable diskette 418) and an optical disk drive 420, (e.g., reading a CD-ROM disk 422 or, to read from or write to other high capacity optical media such as the DVD). The HDD 414, magnetic FDD 416 and optical disk drive 420 can be connected to the system bus 408 by a hard disk drive interface 424, a magnetic disk drive interface 426 and an optical drive interface 428, respectively. The hard disk drive interface 424 for external drive implementations comprises at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 402, the drives and storage media accommodate the storage of any data in a suitable digital format. Although the description of computer-readable storage media above refers to a hard disk drive (HDD), a removable magnetic diskette, and a removable optical media such as a CD or DVD, it should be appreciated by those skilled in the art that other types of storage media which are readable by a computer, such as zip drives, magnetic cassettes, flash memory cards, cartridges, and the like, can also be used in the example operating environment, and further, that any such storage media can contain computer-executable instructions for performing the methods described herein.

A number of program modules can be stored in the drives and RAM 412, comprising an operating system 430, one or more application programs 432, other program modules 434 and program data 436. All or portions of the operating system, applications, modules, and/or data can also be cached in the RAM 412. The systems and methods described herein can be implemented utilizing various commercially available operating systems or combinations of operating systems.

A user can enter commands and information into the computer 402 through one or more wired/wireless input devices, e.g., a keyboard 438 and a pointing device, such as a mouse 440. Other input devices (not shown) can comprise a microphone, an infrared (IR) remote control, a joystick, a game pad, a stylus pen, touch screen or the like. These and other input devices are often connected to the processing unit 404 through an input device interface 442 that can be coupled to the system bus 408, but can be connected by other interfaces, such as a parallel port, an IEEE 1394 serial port, a game port, a universal serial bus (USB) port, an IR interface, etc.

A monitor 444 or other type of display device can be also connected to the system bus 408 via an interface, such as a video adapter 446. It will also be appreciated that in alternative embodiments, a monitor 444 can also be any display device (e.g., another computer having a display, a smart phone, a tablet computer, etc.) for receiving display information associated with computer 402 via any communication means, including via the Internet and cloud-based networks. In addition to the monitor 444, a computer typically comprises other peripheral output devices (not shown), such as speakers, printers, etc.

The computer 402 can operate in a networked environment using logical connections via wired and/or wireless communications to one or more remote computers, such as a remote computer(s) 448. The remote computer(s) 448 can be a workstation, a server computer, a router, a personal computer, portable computer, microprocessor-based entertainment appliance, a peer device or other common network node, and typically comprises many or all of the elements described relative to the computer 402, although, for purposes of brevity, only a remote memory/storage device 450 is illustrated. The logical connections depicted comprise wired/wireless connectivity to a local area network (LAN) 452 and/or larger networks, e.g., a wide area network (WAN) 454. Such LAN and WAN networking environments are commonplace in offices and companies, and facilitate enterprise-wide computer networks, such as intranets, all of which can connect to a global communications network, e.g., the Internet.

When used in a LAN networking environment, the computer 402 can be connected to the LAN 452 through a wired and/or wireless communication network interface or adapter 456. The adapter 456 can facilitate wired or wireless communication to the LAN 452, which can also comprise a wireless AP disposed thereon for communicating with the adapter 456.

When used in a WAN networking environment, the computer 402 can comprise a modem 458 or can be connected to a communications server on the WAN 454 or has other means for establishing communications over the WAN 454, such as by way of the Internet. The modem 458, which can be internal or external and a wired or wireless device, can be connected to the system bus 408 via the input device interface 442. In a networked environment, program modules depicted relative to the computer 402 or portions thereof, can be stored in the remote memory/storage device 450. It will be appreciated that the network connections shown are example and other means of establishing a communications link between the computers can be used.

The computer 402 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This can comprise Wireless Fidelity (Wi-Fi) and BLUETOOTH® wireless technologies. Thus, the communication can be a predefined structure as with a conventional network or simply an ad hoc communication between at least two devices.

Wi-Fi can allow connection to the Internet from a couch at home, a bed in a hotel room or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE 802.11 (a, b, g, n, ac, ag, etc.) to provide secure, reliable, fast wireless connectivity. A Wi-Fi network can be used to connect computers to each other, to the Internet, and to wired networks (which can use IEEE 802.3 or Ethernet). Wi-Fi networks operate in the unlicensed 2.4 and 5 GHz radio bands for example or with products that contain both bands (dual band), so the networks can provide real-world performance similar to the basic 10BaseT wired Ethernet networks used in many offices.

Figure 10:
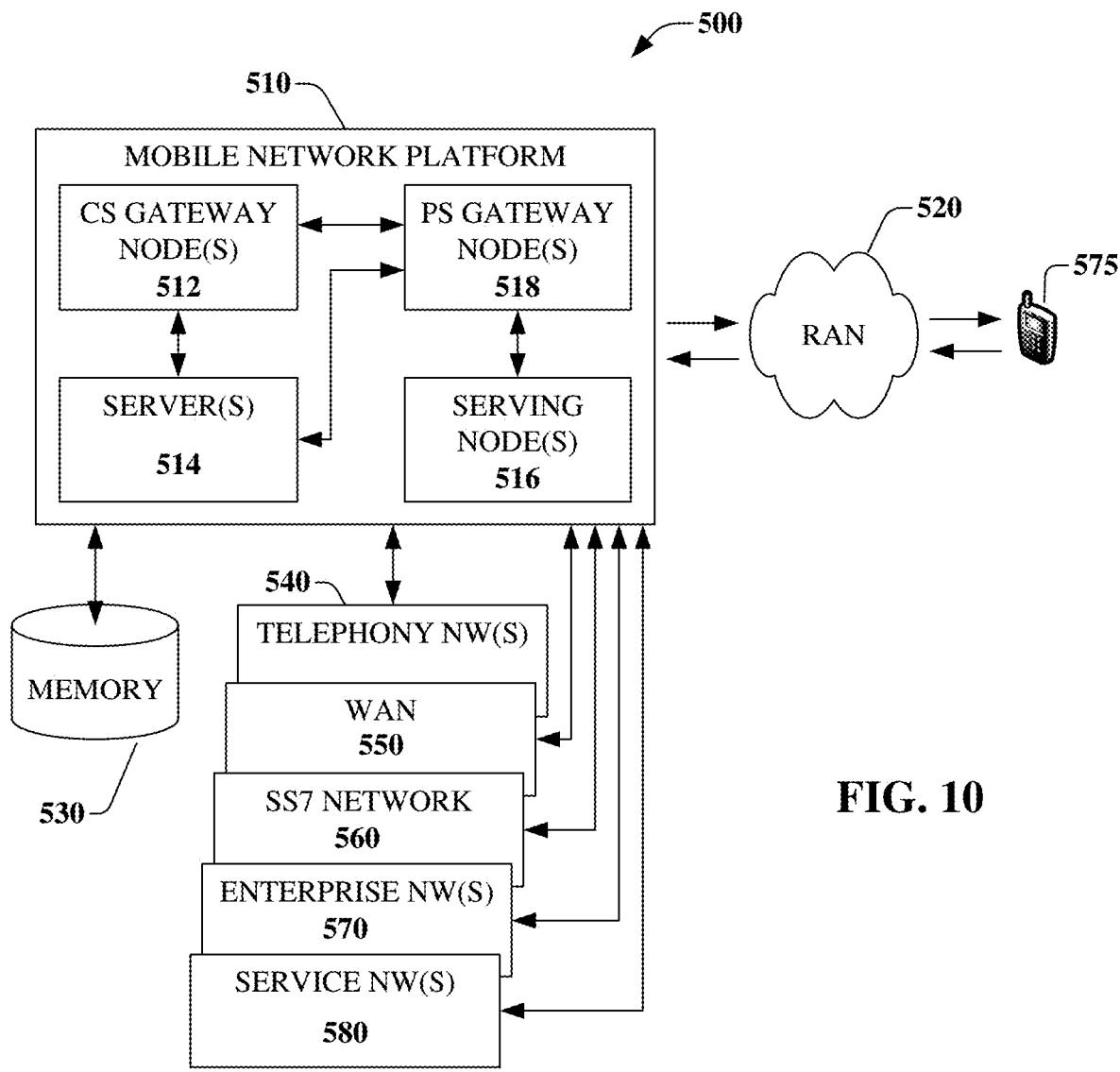
FIG. 10 is a block diagram of an example, non-limiting embodiment of a mobile network platform in accordance with various aspects described herein.

Turning now to FIG. 10, an embodiment 500 of a mobile network platform 510 is shown that is an example of network elements 150, 152, 154, 156, and/or VNEs 330, 332, 334, etc. For example, platform 510 can facilitate in whole or in part the video streaming and/or scalable video coding scheme described herein. In one or more embodiments, the mobile network platform 510 can generate and receive signals transmitted and received by base stations or access points such as base station or access point 122. Generally, mobile network platform 510 can comprise components, e.g., nodes, gateways, interfaces, servers, or disparate platforms, that facilitate both packet-switched (PS) (e.g., internet protocol (IP), frame relay, asynchronous transfer mode (ATM)) and circuit-switched (CS) traffic (e.g., voice and data), as well as control generation for networked wireless telecommunication. As a non-limiting example, mobile network platform 510 can be included in telecommunications carrier networks, and can be considered carrier-side components as discussed elsewhere herein. Mobile network platform 510 comprises CS gateway node(s) 512 which can interface CS traffic received from legacy networks like telephony network(s) 540 (e.g., public switched telephone network (PSTN), or public land mobile network (PLMN)) or a signaling system #7 (SS7) network 560. CS gateway node(s) 512 can authorize and authenticate traffic (e.g., voice) arising from such networks. Additionally, CS gateway node(s) 512 can access mobility, or roaming, data generated through SS7 network 560; for instance, mobility data stored in a visited location register (VLR), which can reside in memory 530. Moreover, CS gateway node(s) 512 interfaces CS-based traffic and signaling and PS gateway node(s) 518. As an example, in a 3GPP UMTS network, CS gateway node(s) 512 can be realized at least in part in gateway GPRS support node(s) (GGSN). It should be appreciated that functionality and specific operation of CS gateway node(s) 512, PS gateway node(s) 518, and serving node(s) 516, is provided and dictated by radio technology(ies) utilized by mobile network platform 510 for telecommunication over a radio access network 520 with other devices, such as a radiotelephone 575.

In addition to receiving and processing CS-switched traffic and signaling, PS gateway node(s) 518 can authorize and authenticate PS-based data sessions with served mobile devices. Data sessions can comprise traffic, or content(s), exchanged with networks external to the mobile network platform 510, like wide area network(s) (WANs) 550, enterprise network(s) 570, and service network(s) 580, which can be embodied in local area network(s) (LANs), can also be interfaced with mobile network platform 510 through PS gateway node(s) 518. It is to be noted that WANs 550 and enterprise network(s) 570 can embody, at least in part, a service network(s) like IP multimedia subsystem (IMS). Based on radio technology layer(s) available in technology resource(s) or radio access network 520, PS gateway node(s) 518 can generate packet data protocol contexts when a data session is established; other data structures that facilitate routing of packetized data also can be generated. To that end, in an aspect, PS gateway node(s) 518 can comprise a tunnel interface (e.g., tunnel termination gateway (TTG) in 3GPP UMTS network(s) (not shown)) which can facilitate packetized communication with disparate wireless network(s), such as Wi-Fi networks.

In embodiment 500, mobile network platform 510 also comprises serving node(s) 516 that, based upon available radio technology layer(s) within technology resource(s) in the radio access network 520, convey the various packetized flows of data streams received through PS gateway node(s) 518. It is to be noted that for technology resource(s) that rely primarily on CS communication, server node(s) can deliver traffic without reliance on PS gateway node(s) 518; for example, server node(s) can embody at least in part a mobile switching center. As an example, in a 3GPP UMTS network, serving node(s) 516 can be embodied in serving GPRS support node(s) (SGSN).

For radio technologies that exploit packetized communication, server(s) 514 in mobile network platform 510 can execute numerous applications that can generate multiple disparate packetized data streams or flows, and manage (e.g., schedule, queue, format . . . ) such flows. Such application(s) can comprise add-on features to standard services (for example, provisioning, billing, customer support . . . ) provided by mobile network platform 510. Data streams (e.g., content(s) that are part of a voice call or data session) can be conveyed to PS gateway node(s) 518 for authorization/authentication and initiation of a data session, and to serving node(s) 516 for communication thereafter. In addition to application server, server(s) 514 can comprise utility server(s), a utility server can comprise a provisioning server, an operations and maintenance server, a security server that can implement at least in part a certificate authority and firewalls as well as other security mechanisms, and the like. In an aspect, security server(s) secure communication served through mobile network platform 510 to ensure network's operation and data integrity in addition to authorization and authentication procedures that CS gateway node(s) 512 and PS gateway node(s) 518 can enact. Moreover, provisioning server(s) can provision services from external network(s) like networks operated by a disparate service provider; for instance, WAN 550 or Global Positioning System (GPS) network(s) (not shown). Provisioning server(s) can also provision coverage through networks associated to mobile network platform 510 (e.g., deployed and operated by the same service provider), such as the distributed antennas networks shown in FIG. 1(*s*) that enhance wireless service coverage by providing more network coverage.

It is to be noted that server(s) 514 can comprise one or more processors configured to confer at least in part the functionality of mobile network platform 510. To that end, the one or more processor can execute code instructions stored in memory 530, for example. It is should be appreciated that server(s) 514 can comprise a content manager, which operates in substantially the same manner as described hereinbefore.

In example embodiment 500, memory 530 can store information related to operation of mobile network platform 510. Other operational information can comprise provisioning information of mobile devices served through mobile network platform 510, subscriber databases; application intelligence, pricing schemes, e.g., promotional rates, flat-rate programs, couponing campaigns; technical specification(s) consistent with telecommunication protocols for operation of disparate radio, or wireless, technology layers; and so forth. Memory 530 can also store information from at least one of telephony network(s) 540, WAN 550, SS7 network 560, or enterprise network(s) 570. In an aspect, memory 530 can be, for example, accessed as part of a data store component or as a remotely connected memory store.

In order to provide a context for the various aspects of the disclosed subject matter, FIG. 10, and the following discussion, are intended to provide a brief, general description of a suitable environment in which the various aspects of the disclosed subject matter can be implemented. While the subject matter has been described above in the general context of computer-executable instructions of a computer program that runs on a computer and/or computers, those skilled in the art will recognize that the disclosed subject matter also can be implemented in combination with other program modules. Generally, program modules comprise routines, programs, components, data structures, etc. that perform particular tasks and/or implement particular abstract data types.

Figure 11:
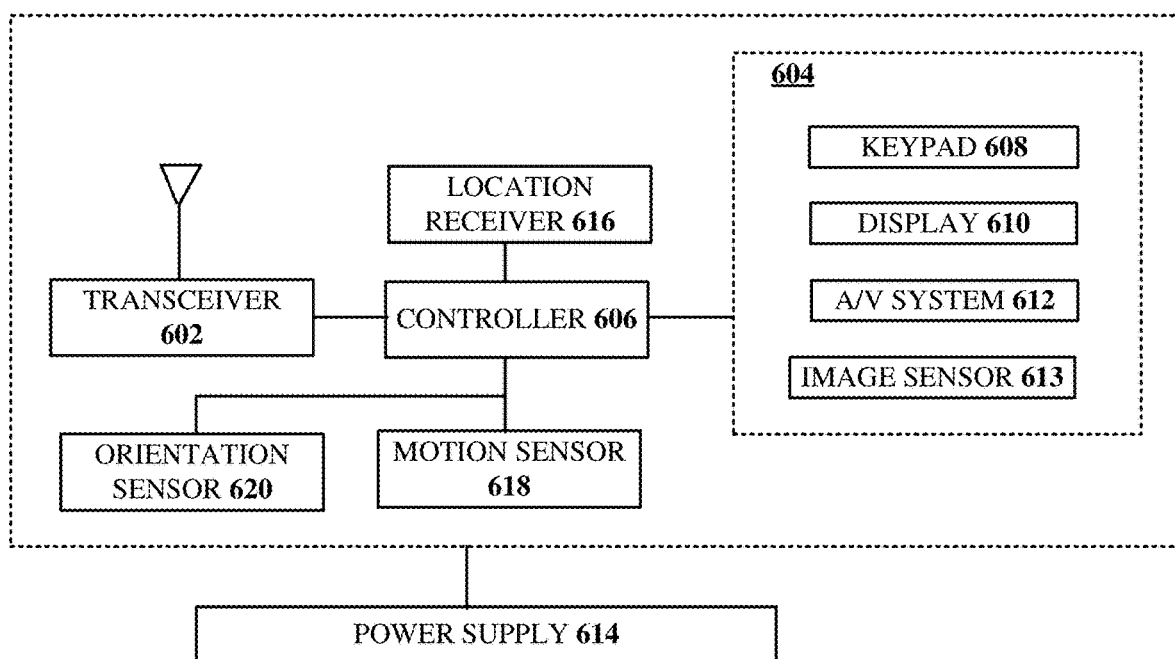
FIG. 11 is a block diagram of an example, non-limiting embodiment of a communication device in accordance with various aspects described herein.

Turning now to FIG. 11, an illustrative embodiment of a communication device 600 is shown. The communication device 600 can serve as an illustrative embodiment of devices such as data terminals 114, mobile devices 124, vehicle 126, display devices 144 or other client devices for communication via either communications network 125. For example, computing device 600 can facilitate in whole or in part the video streaming and/or scalable video coding scheme described herein.

The communication device 600 can comprise a wireline and/or wireless transceiver 602 (herein transceiver 602), a user interface (UI) 604, a power supply 614, a location receiver 616, a motion sensor 618, an orientation sensor 620, and a controller 606 for managing operations thereof. The transceiver 602 can support short-range or long-range wireless access technologies such as Bluetooth®, ZigBee®, WiFi, DECT, or cellular communication technologies, just to mention a few (Bluetooth® and ZigBee® are trademarks registered by the Bluetooth® Special Interest Group and the ZigBee® Alliance, respectively). Cellular technologies can include, for example, CDMA-1X, UMTS/HSDPA, GSM/GPRS, TDMA/EDGE, EV/DO, WiMAX, SDR, LTE, as well as other next generation wireless communication technologies as they arise. The transceiver 602 can also be adapted to support circuit-switched wireline access technologies (such as PSTN), packet-switched wireline access technologies (such as TCP/IP, VoIP, etc.), and combinations thereof.

The UI 604 can include a depressible or touch-sensitive keypad 608 with a navigation mechanism such as a roller ball, a joystick, a mouse, or a navigation disk for manipulating operations of the communication device 600. The keypad 608 can be an integral part of a housing assembly of the communication device 600 or an independent device operably coupled thereto by a tethered wireline interface (such as a USB cable) or a wireless interface supporting for example Bluetooth®. The keypad 608 can represent a numeric keypad commonly used by phones, and/or a QWERTY keypad with alphanumeric keys. The UI 604 can further include a display 610 such as monochrome or color LCD (Liquid Crystal Display), OLED (Organic Light Emitting Diode) or other suitable display technology for conveying images to an end user of the communication device 600. In an embodiment where the display 610 is touch-sensitive, a portion or all of the keypad 608 can be presented by way of the display 610 with navigation features.

The display 610 can use touch screen technology to also serve as a user interface for detecting user input. As a touch screen display, the communication device 600 can be adapted to present a user interface having graphical user interface (GUI) elements that can be selected by a user with a touch of a finger. The display 610 can be equipped with capacitive, resistive or other forms of sensing technology to detect how much surface area of a user's finger has been placed on a portion of the touch screen display. This sensing information can be used to control the manipulation of the GUI elements or other functions of the user interface. The display 610 can be an integral part of the housing assembly of the communication device 600 or an independent device communicatively coupled thereto by a tethered wireline interface (such as a cable) or a wireless interface.

The UI 604 can also include an audio system 612 that utilizes audio technology for conveying low volume audio (such as audio heard in proximity of a human ear) and high volume audio (such as speakerphone for hands free operation). The audio system 612 can further include a microphone for receiving audible signals of an end user. The audio system 612 can also be used for voice recognition applications. The UI 604 can further include an image sensor 613 such as a charged coupled device (CCD) camera for capturing still or moving images.

The power supply 614 can utilize common power management technologies such as replaceable and rechargeable batteries, supply regulation technologies, and/or charging system technologies for supplying energy to the components of the communication device 600 to facilitate long-range or short-range portable communications. Alternatively, or in combination, the charging system can utilize external power sources such as DC power supplied over a physical interface such as a USB port or other suitable tethering technologies.

The location receiver 616 can utilize location technology such as a global positioning system (GPS) receiver capable of assisted GPS for identifying a location of the communication device 600 based on signals generated by a constellation of GPS satellites, which can be used for facilitating location services such as navigation. The motion sensor 618 can utilize motion sensing technology such as an accelerometer, a gyroscope, or other suitable motion sensing technology to detect motion of the communication device 600 in three-dimensional space. The orientation sensor 620 can utilize orientation sensing technology such as a magnetometer to detect the orientation of the communication device 600 (north, south, west, and east, as well as combined orientations in degrees, minutes, or other suitable orientation metrics).

The communication device 600 can use the transceiver 602 to also determine a proximity to a cellular, WiFi, Bluetooth®, or other wireless access points by sensing techniques such as utilizing a received signal strength indicator (RSSI) and/or signal time of arrival (TOA) or time of flight (TOF) measurements. The controller 606 can utilize computing technologies such as a microprocessor, a digital signal processor (DSP), programmable gate arrays, application specific integrated circuits, and/or a video processor with associated storage memory such as Flash, ROM, RAM, SRAM, DRAM or other storage technologies for executing computer instructions, controlling, and processing data supplied by the aforementioned components of the communication device 600.

Other components not shown in FIG. 11 can be used in one or more embodiments of the subject disclosure. For instance, the communication device 600 can include a slot for adding or removing an identity module such as a Subscriber Identity Module (SIM) card or Universal Integrated Circuit Card (UICC). SIM or UICC cards can be used for identifying subscriber services, executing programs, storing subscriber data, and so on.

The terms "first," "second," "third," and so forth, as used in the claims, unless otherwise clear by context, is for clarity only and doesn't otherwise indicate or imply any order in time. For instance, "a first determination," "a second determination," and "a third determination," does not indicate or imply that the first determination is to be made before the second determination, or vice versa, etc.

In the subject specification, terms such as "store," "storage," "data store," data storage," "database," and substantially any other information storage component relevant to operation and functionality of a component, refer to "memory components," or entities embodied in a "memory" or components comprising the memory. It will be appreciated that the memory components described herein can be either volatile memory or nonvolatile memory, or can comprise both volatile and nonvolatile memory, by way of illustration, and not limitation, volatile memory, non-volatile memory, disk storage, and memory storage. Further, non-volatile memory can be included in read only memory (ROM), programmable ROM (PROM), electrically programmable ROM (EPROM), electrically erasable ROM (EEPROM), or flash memory. Volatile memory can comprise random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

Moreover, it will be noted that the disclosed subject matter can be practiced with other computer system configurations, comprising single-processor or multiprocessor computer systems, mini-computing devices, mainframe computers, as well as personal computers, hand-held computing devices (e.g., PDA, phone, smartphone, watch, tablet computers, netbook computers, etc.), microprocessor-based or programmable consumer or industrial electronics, and the like. The illustrated aspects can also be practiced in distributed computing environments where tasks are performed by remote processing devices that are linked through a communications network; however, some if not all aspects of the subject disclosure can be practiced on stand-alone computers. In a distributed computing environment, program modules can be located in both local and remote memory storage devices.

Some of the embodiments described herein can also employ artificial intelligence (AI) to facilitate automating one or more features described herein. The embodiments (e.g., in connection with automatically identifying acquired cell sites that provide a maximum value/benefit after addition to an existing communication network) can employ various AI-based schemes for carrying out various embodiments thereof. Moreover, the classifier can be employed to determine a ranking or priority of each cell site of the acquired network. A classifier is a function that maps an input attribute vector, $x=(x1, x2, x3, x4, \ldots, xn)$, to a confidence that the input belongs to a class, that is, $f(x)$=confidence (class). Such classification can employ a probabilistic and/or statistical-based analysis (e.g., factoring into the analysis utilities and costs) to determine or infer an action that a user desires to be automatically performed. A support vector machine (SVM) is an example of a classifier that can be employed. The SVM operates by finding a hypersurface in the space of possible inputs, which the hypersurface attempts to split the triggering criteria from the non-triggering events. Intuitively, this makes the classification correct for testing data that is near, but not identical to training data. Other directed and undirected model classification approaches comprise, e.g., naïve Bayes, Bayesian networks, decision trees, neural networks, fuzzy logic models, and probabilistic classification models providing different patterns of independence can be employed. Classification as used herein also is inclusive of statistical regression that is utilized to develop models of priority.

As will be readily appreciated, one or more of the embodiments can employ classifiers that are explicitly trained (e.g., via a generic training data) as well as implicitly trained (e.g., via observing UE behavior, operator preferences, historical information, receiving extrinsic information). For example, SVMs can be configured via a learning or training phase within a classifier constructor and feature selection module. Thus, the classifier(s) can be used to automatically learn and perform a number of functions, including but not limited to determining according to predetermined criteria which of the acquired cell sites will benefit a maximum number of subscribers and/or which of the acquired cell sites will add minimum value to the existing communication network coverage, etc.

As used in some contexts in this application, in some embodiments, the terms "component," "system" and the like are intended to refer to, or comprise, a computer-related entity or an entity related to an operational apparatus with one or more specific functionalities, wherein the entity can be either hardware, a combination of hardware and software, software, or software in execution. As an example, a component may be, but is not limited to being, a process running on a processor, a processor, an object, an executable, a thread of execution, computer-executable instructions, a program, and/or a computer. By way of illustration and not limitation, both an application running on a server and the server can be a component. One or more components may reside within a process and/or thread of execution and a component may be localized on one computer and/or distributed between two or more computers. In addition, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor, wherein the processor can be internal or external to the apparatus and executes at least a part of the software or firmware application. As yet another example, a component can be an apparatus that provides specific functionality through electronic components without mechanical parts, the electronic components can comprise a processor therein to execute software or firmware that confers at least in part the functionality of the electronic components. While various components have been illustrated as separate components, it will be appreciated that multiple components can be implemented as a single component, or a single component can be implemented as multiple components, without departing from example embodiments.

Further, the various embodiments can be implemented as a method, apparatus or article of manufacture using standard programming and/or engineering techniques to produce software, firmware, hardware or any combination thereof to control a computer to implement the disclosed subject matter. The term "article of manufacture" as used herein is intended to encompass a computer program accessible from any computer-readable device or computer-readable storage/communications media. For example, computer readable storage media can include, but are not limited to, magnetic storage devices (e.g., hard disk, floppy disk, magnetic strips), optical disks (e.g., compact disk (CD), digital versatile disk (DVD)), smart cards, and flash memory devices (e.g., card, stick, key drive). Of course, those skilled in the art will recognize many modifications can be made to this configuration without departing from the scope or spirit of the various embodiments.

In addition, the words "example" and "exemplary" are used herein to mean serving as an instance or illustration. Any embodiment or design described herein as "example" or "exemplary" is not necessarily to be construed as preferred or advantageous over other embodiments or designs. Rather, use of the word example or exemplary is intended to present concepts in a concrete fashion. As used in this application, the term "or" is intended to mean an inclusive "or" rather than an exclusive "or". That is, unless specified otherwise or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Moreover, terms such as "user equipment," "mobile station," "mobile," subscriber station," "access terminal," "terminal," "handset," "mobile device" (and/or terms representing similar terminology) can refer to a wireless device utilized by a subscriber or user of a wireless communication service to receive or convey data, control, voice, video, sound, gaming or substantially any data-stream or signaling-stream. The foregoing terms are utilized interchangeably herein and with reference to the related drawings.

Furthermore, the terms "user," "subscriber," "customer," "consumer" and the like are employed interchangeably throughout, unless context warrants particular distinctions among the terms. It should be appreciated that such terms can refer to human entities or automated components supported through artificial intelligence (e.g., a capacity to make inference based, at least, on complex mathematical formalisms), which can provide simulated vision, sound recognition and so forth.

As employed herein, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components or any combination thereof designed to perform the functions described herein. Processors can exploit nano-scale architectures such as, but not limited to, molecular and quantum-dot based transistors, switches and gates, in order to optimize space usage or enhance performance of user equipment. A processor can also be implemented as a combination of computing processing units.

As used herein, terms such as "data storage," data storage," "database," and substantially any other information storage component relevant to operation and functionality of a component, refer to "memory components," or entities embodied in a "memory" or components comprising the memory. It will be appreciated that the memory components or computer-readable storage media, described herein can be either volatile memory or nonvolatile memory or can include both volatile and nonvolatile memory.

What has been described above includes mere examples of various embodiments. It is, of course, not possible to describe every conceivable combination of components or methodologies for purposes of describing these examples, but one of ordinary skill in the art can recognize that many further combinations and permutations of the present embodiments are possible. Accordingly, the embodiments disclosed and/or claimed herein are intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

In addition, a flow diagram may include a "start" and/or "continue" indication. The "start" and "continue" indications reflect that the steps presented can optionally be incorporated in or otherwise used in conjunction with other routines. In this context, "start" indicates the beginning of the first step presented and may be preceded by other activities not specifically shown. Further, the "continue" indication reflects that the steps presented may be performed multiple times and/or may be succeeded by other activities not specifically shown. Further, while a flow diagram indicates a particular ordering of steps, other orderings are likewise possible provided that the principles of causality are maintained.

As may also be used herein, the term(s) "operably coupled to", "coupled to", and/or "coupling" includes direct coupling between items and/or indirect coupling between items via one or more intervening items. Such items and intervening items include, but are not limited to, junctions, communication paths, components, circuit elements, circuits, functional blocks, and/or devices. As an example of indirect coupling, a signal conveyed from a first item to a second item may be modified by one or more intervening items by modifying the form, nature or format of information in a signal, while one or more elements of the information in the signal are nevertheless conveyed in a manner than can be recognized by the second item. In a further example of indirect coupling, an action in a first item can cause a reaction on the second item, as a result of actions and/or reactions in one or more intervening items.+

Although specific embodiments have been illustrated and described herein, it should be appreciated that any arrangement which achieves the same or similar purpose may be substituted for the embodiments described or shown by the subject disclosure. The subject disclosure is intended to cover any and all adaptations or variations of various embodiments. Combinations of the above embodiments, and other embodiments not specifically described herein, can be used in the subject disclosure. For instance, one or more features from one or more embodiments can be combined with one or more features of one or more other embodiments. In one or more embodiments, features that are positively recited can also be negatively recited and excluded from the embodiment with or without replacement by another structural and/or functional feature. The steps or functions described with respect to the embodiments of the subject disclosure can be performed in any order. The steps or functions described with respect to the embodiments of the subject disclosure can be performed alone or in combination with other steps or functions of the subject disclosure, as well as from other embodiments or from other steps that have not been described in the subject disclosure. Further, more than or less than all of the features described with respect to an embodiment can also be utilized.

What is claimed is:

1. A method comprising:

receiving, by a processing system having a processor, a request for media content, the media content being divided into a series of chunks;

obtaining, by the processing system, information about the series of chunks, the information including a number of chunks of the media content and a number of layers of each chunk in the series of chunks;

obtaining, by the processing system, a bandwidth constraint and a buffer constraint;

determining, by the processing system, whether there is a remaining layer to be downloaded;

in response to determining that there is the remaining layer to be downloaded, determining, by the processing system, a list of chunks that can be downloaded at a current layer and a downloading schedule according to the list of chunks that can be downloaded at the current layer, wherein the determining the list of chunks comprises:

determining, by the processing system, whether there is a remaining chunk at the current layer;

in response to determining that there is the remaining chunk at the current layer, determining, by the processing system, whether the bandwidth constraint would be violated;

in response to determining that the bandwidth constraint would not be violated, determining, by the processing system, whether the buffer constraint would be violated;

in response to determining that the buffer constraint would not be violated, adding, by the processing system, the remaining chunk to the list of chunks; and in response to determining that there is no remaining chunk at the current layer, producing, by the processing system, the list of chunks;

in response to determining that there is no remaining layer to be downloaded, producing, by the processing system, a composite schedule for downloading the media content; and downloading, by the processing system, the media content according to the composite schedule.

2. The method of claim 1, wherein the determining the downloading schedule comprises:

determining, by the processing system, whether there is a remaining chunk at the current layer;

in response to determining that there is the remaining chunk at the current layer, determining, by the processing system, a time that the remaining chunk can be downloaded;

adding, by the processing system, the time that the remaining chunk can be downloaded to the downloading schedule; and in response to determining that there is no remaining chunk at the current layer, producing, by the processing system, the downloading schedule.

3. The method of claim 1, wherein the list of chunks that can be downloaded at the current layer lists each chunk in the series of chunks in order from a last chunk to a first chunk.

4. The method of claim 1, wherein the composite schedule includes at least a base layer for each chunk in the series of chunks.

5. The method of claim 1, wherein the determining the list of chunks that can be downloaded at the current layer, further comprises:

determining, by the processing system, a base list of chunks that can be downloaded at a base layer;

determining, by the processing system, an intermediate list of chunks that can be downloaded at an intermediate layer; and determining, by the processing system, a top list of chunks that can be downloaded at a top layer.

6. The method of claim 5, wherein the base layer for each chunk represents that chunk at a low resolution.

7. The method of claim 6, wherein the base layer combined with the intermediate layer for each chunk represents that chunk at an intermediate resolution, the intermediate resolution being greater than the low resolution.

8. The method of claim 7, wherein the base layer combined with the intermediate layer and the top layer for each chunk represents that chunk at a high resolution, the high resolution being greater than the intermediate resolution.

9. The method of claim 5, wherein, for each chunk in the series of chunks, the base layer is downloaded before the intermediate layer and the intermediate layer is downloaded before the top layer.

10. A device, comprising:

a processing system including a processor; and a memory that stores executable instructions that, when executed by the processing system, facilitate performance of operations, comprising:

receiving a request for media content, the media content being divided into a plurality of chunks;

obtaining information about the plurality of chunks of the media content, the information including a first number indicating a quantity of chunks of the plurality of chunks and a second number indicating a quantity of layers of each chunk of the plurality of chunks;

obtaining a bandwidth constraint and a buffer constraint;

determining a minimum stall time to download a base layer of each chunk of the plurality of chunks according to the first number, the bandwidth constraint, and the buffer constraint;

determining a base downloading schedule for all chunks of the plurality of chunks at the base layer;

downloading all chunks of the plurality of chunks at the base layer;

determining whether there is a remaining enhancement layer to be downloaded;

in response to determining that there is the remaining enhancement layer to be downloaded, determining a list of chunks that can be downloaded at a current enhancement layer and an enhancement downloading schedule according to the list of chunks that can be downloaded at the current enhancement layer, wherein the determining the list of chunks comprises:
  determining whether there is a remaining chunk at the current enhancement layer;
  in response to determining that there is the remaining chunk at the current enhancement layer, determining whether the bandwidth constraint would be violated;
  in response to determining that the bandwidth constraint would not be violated, determining whether the buffer constraint would be violated;
  in response to determining that the buffer constraint would not be violated, adding the remaining chunk to the list of chunks; and
  in response to determining that there is no remaining chunk at the current enhancement layer, producing the list of chunks;
in response to determining that there is no remaining enhancement layer to be downloaded, producing a composite schedule for downloading the media content; and
downloading enhancement layers of the media content according to the composite schedule.

11. The device of claim 10, wherein the determining the enhancement downloading schedule comprises:
  determining whether there is a remaining chunk at the current enhancement layer;
  in response to determining that there is the remaining chunk at the current enhancement layer, determining a time that the remaining chunk can be downloaded;
  adding the time that the remaining chunk can be downloaded to the enhancement downloading schedule; and
  in response to determining that there is no remaining chunk at the current enhancement layer, producing the enhancement downloading schedule.

12. The device of claim 10, wherein the list of chunks that can be downloaded at the current enhancement layer lists each chunk in the plurality of chunks in order from a last chunk to a first chunk.

13. The device of claim 10, wherein the list of chunks that can be downloaded at the current enhancement layer does not include any chunk that would cause the bandwidth constraint or the buffer constraint to be violated.

14. A device, comprising:
  a processing system including a processor; and
  a memory that stores executable instructions that, when executed by the processing system, facilitate performance of operations, comprising:
    receiving a request for media content, the media content being divided into a plurality of chunks;
    obtaining information about the plurality of chunks of the media content, the information including a first number indicating a quantity of chunks of the plurality of chunks and a second number indicating a quantity of layers of each chunk of the plurality of chunks;
    obtaining a bandwidth constraint and a buffer constraint;
    determining whether there is a remaining layer to be downloaded;
    in response to determining that there is the remaining layer to be downloaded, determining a list of chunks that can be downloaded at a current layer and a downloading schedule according to the list of chunks that can be downloaded at the current layer wherein the determining the list of chunks comprises:
      determining whether there is a remaining chunk at the current layer;
      in response to determining that there is the remaining chunk at the current layer, determining whether the bandwidth constraint would be violated;
      in response to determining that the bandwidth constraint would not be violated, determining whether the buffer constraint would be violated;
      in response to determining that the buffer constraint would not be violated, adding the remaining chunk to the list of chunks; and
      in response to determining that there is no remaining chunk at the current layer, producing the list of chunks;
    in response to determining that there is no remaining layer to be downloaded, producing a composite schedule for downloading the media content; and
    downloading the media content according to the composite schedule.

15. The device of claim 14, wherein the determining the downloading schedule comprises:
  determining whether there is a remaining chunk at the current layer;
  in response to determining that there is the remaining chunk at the current layer, determining a time that the remaining chunk can be downloaded;
  add the time that the remaining chunk can be downloaded to the downloading schedule; and
  in response to determining that there is no remaining chunk at the current layer, producing, by the processing system, the downloading schedule.

16. The device of claim 14, wherein the list of chunks that can be downloaded at the current layer lists each chunk in the plurality of chunks in order from a last chunk to a first chunk.

17. The device of claim 14, wherein the list of chunks that can be downloaded at the current layer does not include any chunk that would cause the bandwidth constraint or the buffer constraint to be violated.

* * * * *